(12) United States Patent
Wan et al.

(10) Patent No.: US 12,542,910 B2
(45) Date of Patent: Feb. 3, 2026

(54) INFORMATION PROCESSING METHOD AND DEVICE, APPARATUS, AND STORAGE MEDIUM

(71) Applicant: GUANGDONG OPPO MOBILE TELECOMMUNICATIONS CORP., LTD., Guangdong (CN)

(72) Inventors: Shuai Wan, Guangdong (CN); Junyan Huo, Guangdong (CN); Yanzhuo Ma, Guangdong (CN); Fuzheng Yang, Guangdong (CN); Jinkun Guo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 80 days.

(21) Appl. No.: 18/449,206

(22) Filed: Aug. 14, 2023

(65) Prior Publication Data

US 2023/0388519 A1 Nov. 30, 2023

Related U.S. Application Data

(63) Continuation of application No. 17/644,062, filed on Dec. 13, 2021, now Pat. No. 11,778,202, which is a
(Continued)

(51) Int. Cl.
*H04N 19/159* (2014.01)
*H04N 19/176* (2014.01)
*H04N 19/186* (2014.01)

(52) U.S. Cl.
CPC ......... *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS 10,623,774 B2 * 4/2020 Zhao ............... H04N 19/61
11,128,871 B2 9/2021 Abe et al.
(Continued)

FOREIGN PATENT DOCUMENTS

CN 101401436 B 5/2012
CN 105723707 A 6/2016
(Continued)

OTHER PUBLICATIONS

Second Office Action for Japanese Application No. 2021-574894 Issued Jan. 5, 2024, 7 Pages with English Translation.
(Continued)

*Primary Examiner* — Mohammad J Rahman
(74) *Attorney, Agent, or Firm* — PERKINS COIE LLP

(57) ABSTRACT

An information processing method and device, an apparatus, and a storage medium. The method includes: for inputted source video data, predicting a colour component of a coding block in the source video data according to a prediction mode to obtain a first prediction block, wherein the prediction mode is preset and is a Position-Dependent Prediction Combination (PDCP) mode; determining a difference between the colour component of the coding block and a prediction value of the first prediction block to obtain a residual block; and signalling the residual block and the prediction mode in a bitstream.

13 Claims, 11 Drawing Sheets

For inputted source video data, perform a chroma prediction on a chroma value of a coding block in the source video data according to any prediction mode in a second mode combination to obtain a first prediction block — S601

Determine a difference between the chroma value of the coding block and a chroma prediction value of the first prediction block to obtain a residual block — S602

Signal the residual block and the prediction mode in a bitstream — S603

Related U.S. Application Data continuation of application No. PCT/CN2019/092723, filed on Jun. 25, 2019.

(56) References Cited

U.S. PATENT DOCUMENTS

| | | | | |
|---|---|---|---|---|
| 11,284,108 | B2* | 3/2022 | Ko | H04N 19/157 |
| 2013/0114696 | A1 | 5/2013 | Liu et al. | |
| 2015/0124865 | A1 | 5/2015 | Kim et al. | |
| 2017/0280162 | A1* | 9/2017 | Zhao | H04N 19/103 |
| 2017/0338928 | A1* | 11/2017 | Park | H04L 5/0051 |
| 2017/0339404 | A1 | 11/2017 | Panusopone et al. | |
| 2018/0077417 | A1* | 3/2018 | Huang | H04N 19/70 |
| 2018/0098064 | A1* | 4/2018 | Seregin | H04N 19/159 |
| 2018/0220130 | A1 | 8/2018 | Zhang et al. | |
| 2018/0262763 | A1* | 9/2018 | Seregin | H04N 19/463 |
| 2018/0324417 | A1* | 11/2018 | Karczewicz | H04N 19/159 |
| 2018/0324456 | A1 | 11/2018 | Alshin et al. | |
| 2019/0104323 | A1 | 4/2019 | Baylon et al. | |
| 2019/0110045 | A1* | 4/2019 | Zhao | H04N 19/105 |
| 2019/0149822 | A1* | 5/2019 | Kim | H04N 19/18 375/240.02 |
| 2019/0191167 | A1 | 6/2019 | Drugeon et al. | |
| 2019/0306513 | A1 | 10/2019 | Van der Auwera et al. | |
| 2019/0313094 | A1 | 10/2019 | Kanoh et al. | |
| 2019/0335207 | A1 | 10/2019 | Abe et al. | |
| 2020/0007870 | A1* | 1/2020 | Ramasubramonian | H04N 19/61 |
| 2020/0007878 | A1 | 1/2020 | Zhao et al. | |
| 2020/0014924 | A1* | 1/2020 | Zhao | H04N 19/46 |
| 2020/0045326 | A1* | 2/2020 | Zhao | H04N 19/105 |
| 2020/0099928 | A1* | 3/2020 | Piao | H04N 19/176 |
| 2020/0120358 | A1* | 4/2020 | Poirier | H04N 19/176 |
| 2020/0169752 | A1 | 5/2020 | Rath et al. | |
| 2020/0195920 | A1* | 6/2020 | Racape | H04N 19/70 |
| 2020/0221084 | A1 | 7/2020 | Jang et al. | |
| 2020/0236361 | A1 | 7/2020 | Jang et al. | |
| 2020/0260104 | A1* | 8/2020 | Piao | H04N 19/159 |
| 2021/0006778 | A1 | 1/2021 | Kim et al. | |
| 2021/0037259 | A1 | 2/2021 | Ko et al. | |
| 2021/0044808 | A1* | 2/2021 | Kim | H04N 19/70 |
| 2021/0051343 | A1 | 2/2021 | Piao et al. | |
| 2021/0092372 | A1* | 3/2021 | Misra | H04N 19/1883 |
| 2021/0314630 | A1* | 10/2021 | Misra | H04N 19/96 |
| 2021/0360237 | A1 | 11/2021 | Andersson et al. | |

FOREIGN PATENT DOCUMENTS

| | | |
|---|---|---|
| CN | 106412579 A | 2/2017 |
| CN | 107071417 A | 8/2017 |
| CN | 107079165 A | 8/2017 |
| WO | 2018119167 A1 | 6/2018 |
| WO | 2018161954 A1 | 9/2018 |
| WO | 2018231488 A1 | 12/2018 |

OTHER PUBLICATIONS

First Office Action for Chinese Application No. 2022100641255 Issued Feb. 1, 2024, 15 Pages with English Translation.
First Office Action for Indonesia Application No. P00202112089 Issued Jan. 19, 2024 7 Pages with English Translation.
Written Opinion for International Application No. PCT/CN2019/092723, Issued Mar. 26, 2020, 7 Pages with English Translation.
Auwera, et al., Joint Video Experts Team (JVET) of ITU-T SG 16 WP 3 and ISO/IEC JTC 1/SC 29/WG 11 10th Meeting: San Diego, USA, Apr. 10-20, 2018—Document: JVET-J0069—Extension of Simplified PDPC to Diagonal Intral Modes (5 pages).
Auwera, et al., Joint Video Experts Team (JVET) of ITU-T SG 16 WP 3 and ISO/IEC JTC 1/SC 29/WG 11 11th Meeting: Ljubljana, SI, Jul. 10-18, 2018—Document: JVET-K0063—CE3: Simplified PDPC (Test 2.4.1) (6 pages).
Bross, et al., Joint Video Experts Team (JVET) of ITU-T SG 16 WP 3 and ISO/IEC JTC 1/SC 29/WG 11 14th Meeting: Geneva, CH, Mar. 19-27, 2019—Document: JVET-N1001—Versatile Video Coding (Draft 5) (386 pages).
International Search Report issued Mar. 26, 2020 of PCT/CN2019/092723 (4 pages).
ITU-T—Telecommunication Standardization Sector of ITU—H.265 (Feb. 2018) Series H: Audiovisual and Multimedia Systems Infrastructure of audiovisual services—Coding of moving video, High efficiency video coding (692 pages).
ITU-T—Telecommunication Standardization Sector of ITU—H.266—Series H: Audiovisual and Multimedia Systems Infrastructure of audiovisual services—Coding of moving video, Versatile video coding (516 pages).
Lee, et al., Joint Video Experts Team (JVET) of ITU-T SG 16 WP 3 and ISO/IEC JTC 1/SC 29/WG 11 13th Meeting: Marrakech, MA, Jan. 9-18, 2019—JVET-M0238 Non-CE3: Modification of PDPC (9 pages).
Pfaff, et al., Joint Video Experts Team (JVET) of ITU-T SG 16 WP 3 and ISO/IEC JTC 1/SC 29/WG 11 14th Meeting: Geneva, CH, Mar. 19-27, 2019—Document: JVET-N0217—CE3: Affine linear weighted intra prediction (CE3-4.1, CE3-4.2) (29 pages).
Chen et al. "Algorithm description for Versatile Video Coding and Test Model 5 (VTM 5)", JVET-N1002-v2, 14th Meeting: Geneva, CH, Mar. 19-27, 2019. 76 pages.
Extended European Search Report of the European application No. 19935729.4, issued on May 16, 2022. 17 pages.
First Examination report of the Indian application No. 202117057648, issued on Jun. 22, 2022. 6 pages with English Translation.
Lee et al. "CE3-related: Simplification of Popc", JVET-L0152, 12th meeting: Macao, CN, Oct. 3-12, 2018. 6 pages.
Rath et al. "CE3-related: Simplifications of PDPC for diagonal and adjacent diagonal directions", JVET-O0229, 15th Meeting: Gothenburg, SE, Jul. 3-12, 2019. 7 pages.
Examination Report for European Application No. 19935729.4 issued Feb. 2, 2023. 11 pages.
First Office Action of the Japanese application No. 2021-574894, issued on Jul. 4, 2023. 12 pages with English translation.
Non-Final Office Action for U.S. Appl. No. 17/644,062 issued on Feb. 28, 2022, 11 pages.
Final Office Action for U.S. Appl. No. 17/644,062 issued on Jun. 24, 2022, 8 pages.
Non-Final Office Action for U.S. Appl. No. 17/644,062 issued on Sep. 15, 2022, 12 pages.
Final Office Action for U.S. Appl. No. 17/644,062 issued on Dec. 28, 2022, 8 pages.
Advisory Action for U.S. Appl. No. 17/644,062 issued on Mar. 30, 2023, 2 pages.
Notice of Allowance for U.S. Appl. No. 17/644,062 issued on May 24, 2023, 10 pages.
Hearing Notice dated Jan. 16, 2025 for Indian Patent Application No. 202117057648, 2 pages.
Notice of Preliminary Rejection dated Jan. 23, 2025 for Korean Patent Application No. 10-2021-7042622 and English Translation, 12 pages.
Joint Video Experts Team (JVET) of ITU-T SG 16 WP 3 and ISO/IEC JTC 1/SC 29/WG 11, Benjamin Bross, et al., Versatile Video Coding (Draft 5), JVET-N1001-v8 (version 8), Jun. 11, 2019, 400 pages.
Notice of Reasons for Refusal dated Mar. 18, 2025 for Japanese Patent Application No. 2024-056990 and English Translation, 6 pages.
First Final Rejection dated Sep. 26, 2025 for Korean Patent Application No. 10-2021-7042622 and English Translation, 10 pages.

* cited by examiner

INFORMATION PROCESSING METHOD AND DEVICE, APPARATUS, AND STORAGE MEDIUM

CROSS-REFERENCE TO RELATED APPLICATION(S)

This application is a continuation application of the U.S. application Ser. No. 17/644,062, filed Dec. 13, 2021, which is a continuation application of International PCT Application No. PCT/CN2019/092723, filed on Jun. 25, 2019, the entire disclosures of the above applications are hereby incorporated by reference.

TECHNICAL FIELD

Implementations of the present disclosure relate to electronic technology, and relate to but are not limited to a method and an apparatus for processing information, a device, and a storage medium.

BACKGROUND

In recent years, video services have developed rapidly in the field of electronic technology. For video services, source video data needs to be coded first, and the coded video data is transmitted to a user terminal through a channel of a mobile communication network or the Internet.

For a user, fluency of video will directly affect the user's video viewing experience. However, complexity of information processing in video coding directly affects the fluency of the video.

SUMMARY

In view of this, implementations of the present disclosure provide a method and an apparatus for processing information, a device, and a storage medium, to solve at least one problem existing in related technologies.

Technical solutions of the implementations of the present disclosure are implemented as follows.

In a first aspect, an implementation of the present disclosure provides a method for processing information, which includes: for inputted source video data, predicting a colour component of a coding block in the source video data according to a prediction mode to obtain a first prediction block, wherein the prediction mode is preset and is a Position-Dependent Prediction Combination (PDPC) mode; determining a difference between the colour component of the coding block and a prediction value of the first prediction block to obtain a residual block; and signalling the residual block and the prediction mode in a bitstream.

In another implementation, the colour component is a luma value or a chroma value.

In another implementation, predicting the colour component of the coding block according to the prediction mode to obtain the first prediction block includes: performing a chroma prediction on the chroma value of the coding block according to any prediction mode in a first mode combination to obtain the first prediction block; wherein, the first mode combination includes following PDPC modes: a prediction mode with an index smaller than a first numerical value but not a planar prediction mode or a direct current (DC) component prediction mode, a prediction mode with an index greater than the first numerical value and smaller than or equal to a second numerical value, a prediction mode with an index greater than or equal to a third numerical value and smaller than a fourth numerical value, and a prediction mode with an index greater than the fourth numerical value, among N preset spatial prediction modes within a component.

In another implementation, predicting the colour component of the coding block according to the prediction mode to obtain the first prediction block includes: performing a chroma prediction on the chroma value of the coding block according to any prediction mode in a second mode combination to obtain the first prediction block; wherein, the second mode combination includes following PDPC modes: a prediction mode with an index smaller than or equal to a second numerical value but not a planar prediction mode or a DC prediction mode, and a prediction mode with an index greater than or equal to a third numerical value, among N preset spatial prediction modes within a component.

In another implementation, predicting the colour component of the coding block according to the prediction mode to obtain the first prediction block includes: performing a chroma prediction on the chroma value of the coding block according to any prediction mode in a third mode combination to obtain the first prediction block; wherein, the third mode combination includes following PDPC modes: a horizontal prediction mode, a vertical prediction mode, and a prediction mode with an index smaller than or equal to a second numerical value but not a planar prediction mode or a DC prediction mode, and a prediction mode with an index greater than or equal to a third numerical value, among N preset spatial prediction modes within a component.

In another implementation, predicting the colour component of the coding block according to the prediction mode to obtain the first prediction block includes: performing a chroma prediction on the chroma value of the coding block according to any prediction mode in a fourth mode combination to obtain the first prediction block; wherein, the fourth mode combination includes following PDPC modes: a horizontal prediction mode, a vertical prediction mode, and a prediction mode with an index smaller than or equal to a second numerical value and including a planar prediction mode and a DC prediction mode, and a prediction mode with an index greater than or equal to a third numerical value, among N preset spatial prediction modes within a component.

In another implementation, for the inputted source video data, predicting the colour component of the coding block in the source video data according to the prediction mode to obtain the first prediction block includes: performing a luma prediction on the luma value of the coding block according to any prediction mode in any one of the first to fourth mode combinations to obtain the first prediction block.

In a second aspect, an implementation of the present disclosure provides an apparatus for processing information, which includes: a prediction module, configured to, for inputted source video data, predict a colour component of a coding block in the source video data according to a prediction mode to obtain a first prediction block, wherein the prediction mode is preset and is a PDPC mode; a residual determination module, configured to determine a difference between the colour component of the coding block and a prediction value of the first prediction block to obtain a residual block; and a signalling module, configured to signal the residual block and the prediction mode in a bitstream.

In another implementation, the colour component is a luma value or a chroma value.

In another implementation, the prediction module includes: a chroma prediction unit, configured to perform a chroma prediction on the chroma value of the coding block according to any prediction mode in a first mode combination to obtain the first prediction block; wherein the first mode combination includes following PDPC modes: a prediction mode with an index smaller than a first numerical value but not a planar prediction mode or a DC prediction mode, a prediction mode with an index greater than the first numerical value and smaller than or equal to a second numerical value, a prediction mode with an index greater than or equal to a third numerical value and smaller than a fourth numerical value, and a prediction mode with an index greater than the fourth numerical value, among N preset spatial prediction modes within a component.

In another implementation, the prediction module includes a chroma prediction unit, configured to perform a chroma prediction on the chroma value of the coding block according to any prediction mode in a second mode combination to obtain the first prediction block; wherein, the second mode combination includes following PDPC modes: a prediction mode with an index smaller than or equal to a second numerical value but not a planar prediction mode or a DC prediction mode, and a prediction mode with an index greater than or equal to a third numerical value, among N preset spatial prediction modes within a component.

In another implementation, the prediction module includes a chroma prediction unit, configured to perform a chroma prediction on the chroma value of the coding block according to any prediction mode in a third mode combination to obtain the first prediction block; wherein, the third mode combination includes following PDPC modes: a horizontal prediction mode, a vertical prediction mode, and a prediction mode with an index smaller than or equal to a second numerical value but not a planar prediction mode or a DC prediction mode, and a prediction mode with an index greater than or equal to a third numerical value, among N preset spatial prediction modes within a component.

In another implementation, the prediction module includes a chroma prediction unit, configured to perform a chroma prediction on the chroma value of the coding block according to any prediction mode in a fourth mode combination to obtain the first prediction block; wherein, the fourth mode combination includes following PDPC modes: a horizontal prediction mode, a vertical prediction mode, and a prediction mode with an index smaller than or equal to a second numerical value and including a planar prediction mode and a DC prediction mode, and a prediction mode with an index greater than or equal to a third numerical value, among N preset spatial prediction modes within a component.

In another implementation, the prediction module includes a luma prediction unit, configured to perform a luma prediction on the luma value of the coding block according to any prediction mode in any one of the first to fourth mode combinations to obtain the first prediction block.

In a third aspect, an implementation of the present disclosure provides a method for processing information, which includes: for an inputted bitstream, predicting a colour component of a coding block in the bitstream according to a prediction mode in the bitstream to obtain a second prediction block, wherein the prediction mode is preset and is a PDPC mode; determining a sum of a difference of a residual block in the bitstream and a prediction value of the second prediction block to obtain a reconstructed block; and processing the reconstructed block, and outputting processed video data.

In a fourth aspect, an implementation of the present disclosure provides an apparatus for processing information, which includes: a prediction module, configured to, for an inputted bitstream, predict a colour component of a coding block in the bitstream according to a prediction mode in the bitstream to obtain a second prediction block, wherein the prediction mode is preset and is a PDPC mode; a recovery module, configured to determine a sum of a difference of a residual block in the bitstream and a prediction value of the second prediction block to obtain a reconstructed block; and a video output module, configured to process the reconstructed block, and output processed video data.

In a fifth aspect, an implementation of the present disclosure provides a method for processing information, which includes: for inputted source video data, predicting a colour component of a coding block in the source video data according to a prediction mode to obtain a third prediction block, wherein the prediction mode is preset and is a PDPC mode; refining the third prediction block according to the prediction mode to obtain a third refinement block; determining a difference between the colour component of the coding block and a refinement value of the third refinement block to obtain a residual block; and signalling the residual block and the prediction mode in a bitstream.

In a sixth aspect, an implementation of the present disclosure provides an apparatus for processing information, which includes: a prediction module, configured to, for inputted source video data, predict a colour component of a coding block in the source video data according to a prediction mode to obtain a third prediction block, wherein the prediction mode is preset and is a PDPC mode; a refinement module, configured to refine the third prediction block according to the prediction mode to obtain a third refinement block; a residual determination module, configured to determine a difference between the colour component of the coding block and a refinement value of the third refinement block to obtain a residual block; and a signalling module, configured to signal the residual block and the prediction mode in a bitstream.

In a seventh aspect, an implementation of the present disclosure provides a method for processing information, which includes: for an inputted bitstream, predicting a colour component of a coding block in the bitstream according to a prediction mode in the bitstream to obtain a fourth prediction block, wherein the prediction mode is preset and is a PDPC mode; refining the fourth prediction block according to the prediction mode to obtain a fourth refinement block; determining a sum of a difference of a residual block in the bitstream and a refinement value of the fourth refinement block to obtain a reconstructed block; and processing the reconstructed block, and outputting processed video data.

In an eighth aspect, an implementation of the present disclosure provides an apparatus for processing information, which includes: a prediction module, configured to, for an inputted bitstream, predict a colour component of a coding block in the bitstream according to a prediction mode in the bitstream to obtain a fourth prediction block, wherein the prediction mode is preset and is a PDPC mode; a refinement module, configured to refine the fourth prediction block according to the prediction mode to obtain a fourth refinement block; a recovery module, configured to determine a sum of a difference of a residual block in the bitstream and a refinement value of the fourth refinement block to obtain a reconstructed block; and a video output module, configured to process the reconstructed block, and output processed video data.

In a ninth aspect, an implementation of the present disclosure provides an electronic device, including a memory and a processor, wherein the memory stores a computer program which is runnable on the processor, and the processor implements acts in the above method for processing information when executing the program.

In a tenth aspect, an implementation of the present disclosure provides a computer readable storage medium, on which a computer program is stored, wherein when the computer program is executed by a processor, acts in the above method for processing information are implemented.

In an implementation of the present disclosure, for inputted source video data, after the first prediction block is obtained by predicting a colour component of the coding block in the source video data according to a prediction mode which is preset and is the PDPC mode, instead of refining a prediction value in the first prediction block, the difference between the prediction value of the first prediction block and the colour component of the coding block is directly determined. In this way, on the premise of ensuring performance of video coding and decoding, complexity of information processing in video coding and decoding can be reduced, especially complexity of intra prediction processing.

DETAILED DESCRIPTION

In order to make objects, technical solutions, and advantages of implementations of the present disclosure clearer, specific technical solutions of the present disclosure will be described in further detail below with reference to accompanying drawings in the implementations of the present disclosure. Following implementations are intended to illustrate the present disclosure, but are not intended to limit the scope of the present disclosure.

Unless otherwise defined, all technical and scientific terms used herein have same meanings as those commonly understood by those skilled in the technical field of the present disclosure. Terms used herein are only for the purpose of describing the implementations of the present disclosure, but are not intended to limit the present disclosure.

"Some implementations" revolved in following description describe a subset of all possible implementations, but it can be understood that "some implementations" can be a same subset or different subsets of all possible implementations, and can be combined with each other without conflict.

It should be pointed out that the terms "first \ second \ third" in the implementations of the present disclosure are only for distinguishing similar objects, but do not represent a specific order for objects. Understandably, the "first \ second \ third" can be interchanged in a specific order or a sequence if allowed, so that the implementations of the present disclosure described here can be implemented in an order other than that illustrated or described here.

Figure 1:
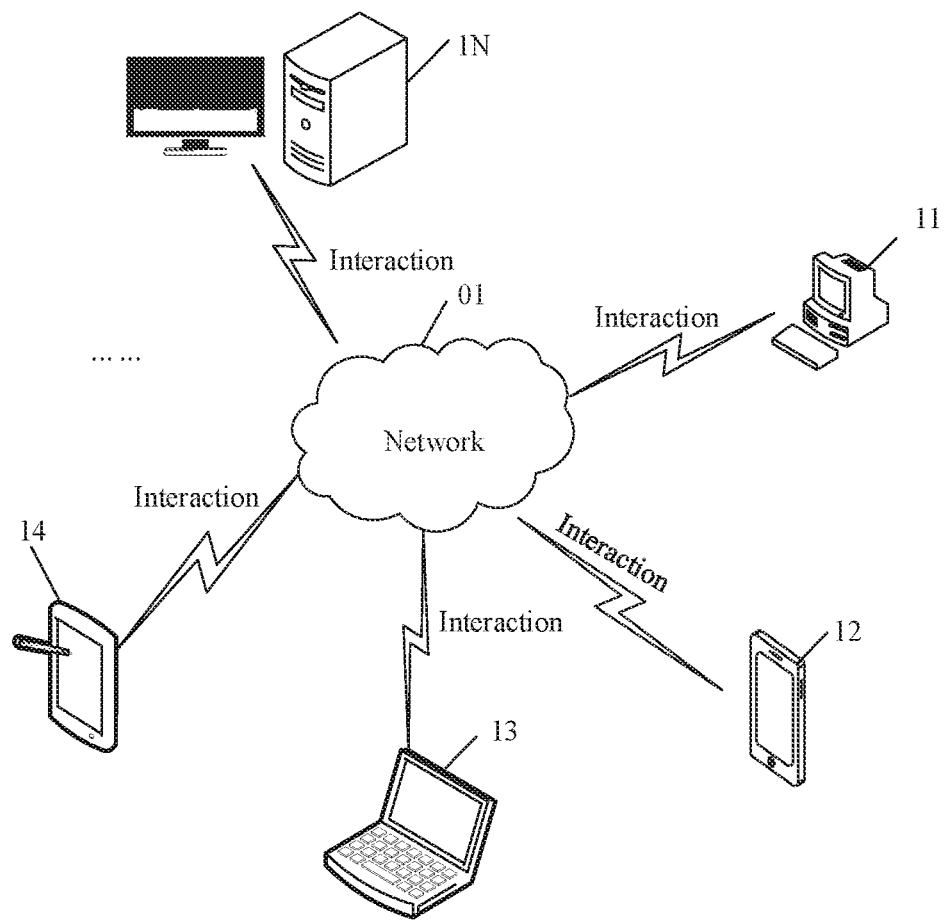
FIG. 1 is a schematic diagram of an architecture of a network according to an implementation of the present disclosure.

The present implementation first provides a network architecture. FIG. 1 is a schematic structure diagram of a network architecture according to an implementation of the present disclosure. As shown in FIG. 1, the network architecture includes one or more electronic devices 11 to 1N and a communication network 01, wherein the electronic devices 11 to 1N may perform video interaction through the communication network 01. The electronic devices may be various devices with video coding and decoding functions in implementation processes. For example, the electronic devices may include mobile phones, tablet computers, e-readers, unmanned aerial vehicles, wearable devices (such as smart glasses, etc.), sweeping robots, personal computers, navigators, video phones, televisions, or servers, etc.

The electronic device has the video coding and decoding functions, and includes a video encoder and/or a video encoder. For example, referring to that shown in FIG. 2A, a composition structure of a video encoder 21 includes: a transform and quantization unit 211, an intra estimation unit 212, an intra prediction unit 213, a motion compensation unit 214, a motion estimation unit 215, an inverse transform and inverse quantization unit 216, a filter controlling and analyzing unit 217, a filtering unit 218, a coding unit 219, and a decoded-picture buffer unit 210, etc. Herein, the filtering unit 218 may implement deblocking filtering and Sample Adaptive Offset (SAO) filtering, and the coding unit 219 may implement header information coding and Context-based Adaptive Binary Arithmatic Coding (CABAC).

For inputted source video data, a video coding block may be obtained by Coding Tree Unit (CTU) division, and then for residual pixel information obtained after intra or inter prediction, the video coding block is transformed by the transform and quantization unit 211, including transforming the residual information from a pixel domain to a transformation domain, and quantizing an obtained transform coefficient to further reduce a bit rate. The intra estimation unit 212 and the intra prediction unit 213 are configured to perform an intra prediction on the video coding block. Specifically, the intra estimation unit 212 and the intra prediction unit 213 are configured to determine an intra prediction mode to be used for coding the video coding block. The motion compensation unit 214 and the motion estimation unit 215 are configured to execute inter prediction coding of the received video coding block with respect to one or more blocks in one or more reference pictures to provide temporal prediction information. A motion estimation executed by the motion estimation unit 215 is a process of generating a motion vector, the motion vector may be used to estimate the motion of the video coding block, and then the motion compensation unit 214 executes a motion compensation based on the motion vector determined by the motion estimation unit 215. After the intra prediction mode is determined, the intra prediction unit 213 is also configured to provide selected intra prediction data to the coding unit 219, and the motion estimation unit 215 also sends calculated motion vector data to the coding unit 219. In addition, the inverse transform and inverse quantization unit 216 is configured to reconstruct the video coding block, reconstruct a residual block in the pixel domain, block effect artifacts are removed for the reconstructed residual block through the filter controlling and analyzing unit 217 and the filtering unit 218, and then the reconstructed residual block is added to an intra predictive block in the decoded-picture buffer unit 210 to generate a reconstructed video coding block. The coding unit 219 is configured to code various coding parameters and quantized transform coefficients. In a CABAC-based coding algorithm, a context content may be based on neighbouring coding blocks, and may be used for coding information indicating the determined intra prediction mode, and outputting a bitstream of the source video data. And the decoded-picture buffer unit 210 is configured to store the reconstructed video coding block for prediction reference. As video picture encoding progresses, new reconstructed video coding blocks will be generated continuously, and these reconstructed video coding blocks will be stored in the decoded picture buffer unit 210.

Figure 2A:
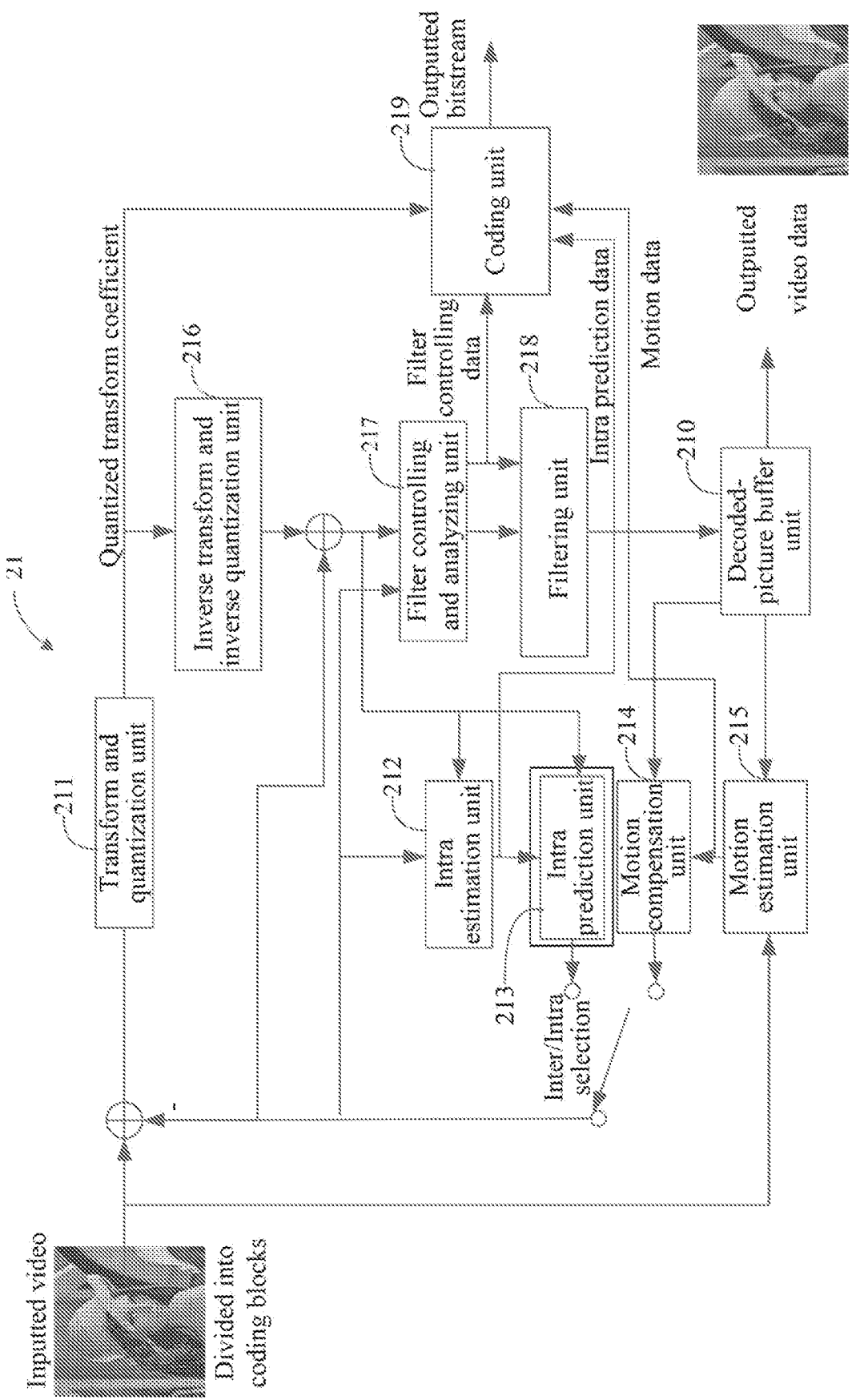
FIG. 2A is a schematic diagram of a structure of a video encoder according to an implementation of the present disclosure.
Figure 2B:
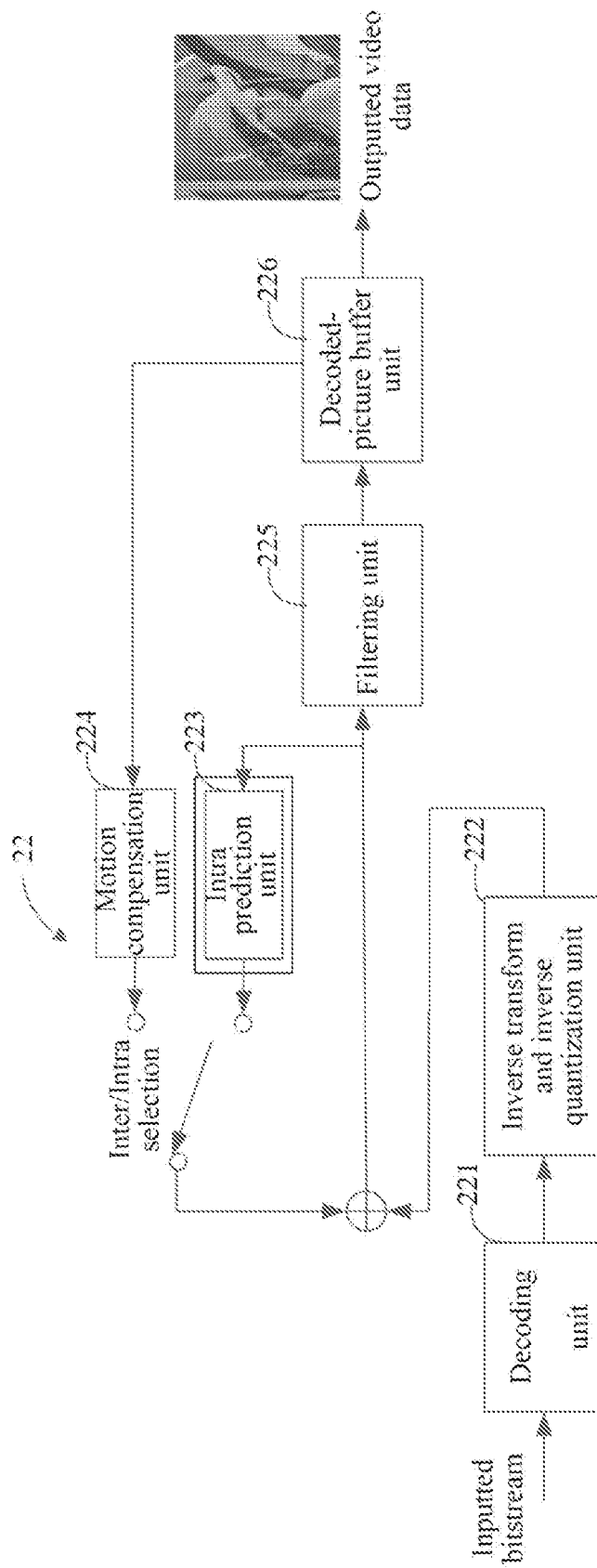
FIG. 2B is a schematic diagram of a structure of a video decoder according to an implementation of the present disclosure.

A video decoder 22 corresponding to the video encoder 21, a composition structure of which is as shown in FIG. 2B, includes: a decoding unit 221, an inverse transform and inverse quantization unit 222, an intra prediction unit 223, a motion compensation unit 224, a filtering unit 225, and a decoded-picture buffer unit 226, etc. Herein the decoding unit 221 may implement header information decoding and CABAC decoding, and the filtering unit 225 may implement deblocking filtering and SAO filtering. After inputted source video data is coded in FIG. 2A, the bitstream of the source video data is outputted. The bitstream is inputted into the video decoder 22, and first passes through the decoding unit 221 to obtain the decoded transform coefficients. The transform coefficients are processed by the inverse transform and inverse quantization unit 222 to generate a residual block in the pixel domain. The intra prediction unit 223 may be configured to generate prediction data of the current video coding block based on the determined intra prediction mode and data which is from a current picture and passes through a coding block previously. The motion compensation unit 224 determines prediction information for the video coding block by parsing the motion vector and another associated syntax element, and uses the prediction information to generate a predictive block of the video coding block which is currently being decoded. A decoded video block is formed by summing the residual block from the inverse transform and inverse quantization unit 222 with the corresponding predictive block generated by the intra prediction unit 223 or the motion compensation unit 224. The obtained decoded video data is processed by the filtering unit 225 to remove blocking effect artifacts, which may improve video quality. Then, the decoded video data is stored in the decoded-picture buffer unit 226, and the decoded-picture buffer unit 226 is configured to store a reference picture for a subsequent intra prediction or motion compensation, and is also configured to output the video data, thus obtaining the recovered source video data.

Before describing the implementations of the present disclosure in detail, firstly, the intra prediction mode is briefly explained.

Figure 2C:
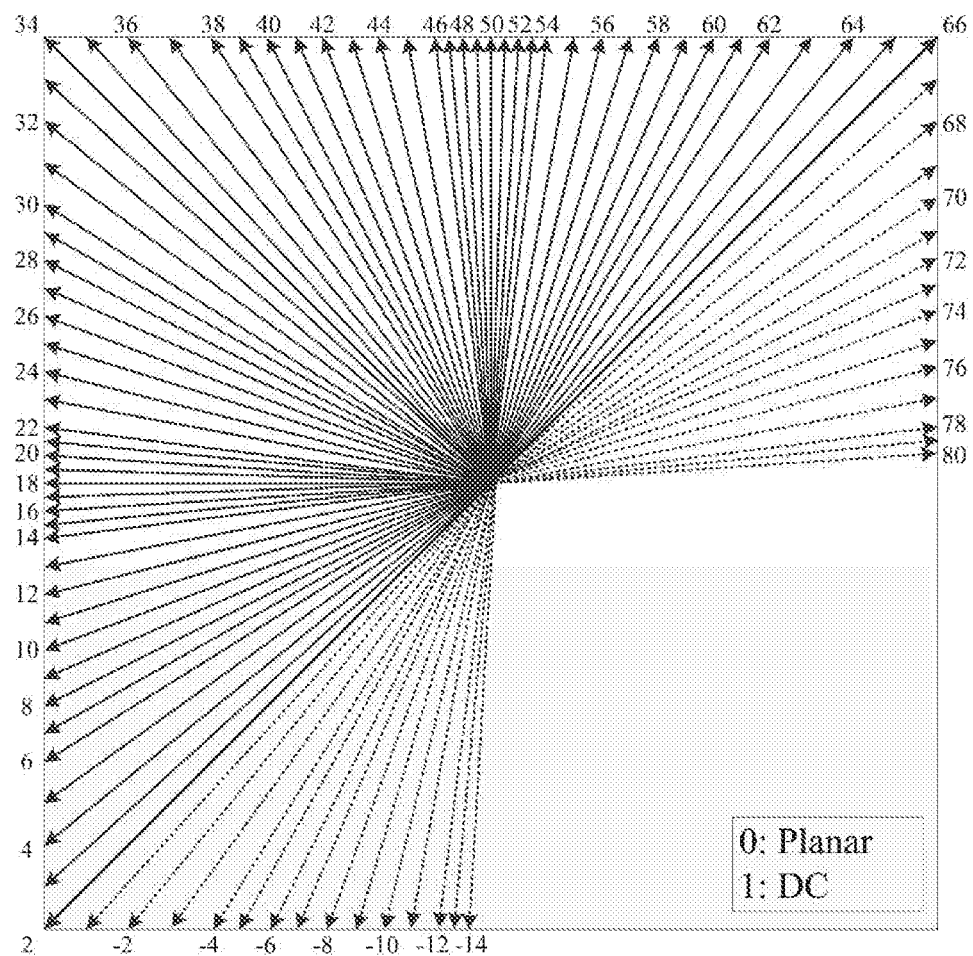
FIG. 2C is a schematic diagram of spatial prediction modes within 94 components according to an implementation of the present disclosure.

In the latest Versatile Video Coding (VVC) draft (also called H.266), in order to capture a finer edge direction presented in natural video, as shown in FIG. 2C, the test model VTM5.0 of VVC defines spatial prediction modes in 94 components indexed from −14 to 80, herein including two non-angular modes, namely Planar mode (hereinafter referred to as a planar prediction mode) indexed 0 and DC mode indexed 1 (hereinafter referred to a DC prediction mode). It should be noted that the index is used for uniquely identifying the prediction mode, and may be used as a mode index when in use. In an intra prediction, an intra spatial prediction within the components is performed on the current block by using one or more prediction modes among the spatial prediction modes within the 94 components.

It should be noted that the method for processing information according to an implementation of the present disclosure is mainly applied to the intra prediction unit 213 shown in FIG. 2A and the intra prediction unit 223 shown in FIG. 2B, and is used for obtaining a intra prediction value of the current block. That is to say, the method for processing information according to an implementation of the present disclosure may be applied to the video encoder 21, or the video decoder 22, or may even be applied to the video encoder and the video decoder at the same time, which is not specifically limited in an implementation of the present disclosure. When the method described below is used in the unit 213, the "current block" refers to a coding block in the unit 213; when the method described below is used in the unit 223, the "current block" refers to a coding block in the unit 223.

In the related art, an intra prediction process executed by the intra prediction unit 213/223 will be described. Generally speaking, the intra prediction process mainly includes following acts S201 to S204.

In the act S201, before performing luma and chroma predictions on the current block (which may be a coding block or a coding block), it is necessary to obtain values of reference pixels around the current block first. If none of the reference pixels exists, the pixel value of 512 is used for filling; if only part of the reference pixels do not exist, values of the nearest existing reference pixels are used for filling.

In the act S202, it is determined whether the reference pixels need to be filtered according to a specific condition such as the prediction mode, or a size of the current block, etc. If filtering is needed, a three-tap smoothing filter with a coefficient of [1,2,1] is used to filter the reference pixels.

In the act S203, according to a calculation way of every prediction mode, the reference pixels are used to predict the current block, to obtain a prediction value of each pixel in the current block.

In the act S204, for following several prediction modes, it is needed that after obtaining the prediction value of each pixel in the current block, PDPC is used to further refine the prediction value: the planar prediction mode, the DC prediction mode, a horizontal prediction mode, a vertical prediction mode, an angular prediction mode with the index smaller than or equal to 10 (including a wide-angle mode), and an angular prediction mode with the index greater than or equal to 58 (including the wide-angle mode). Wherein, the planar prediction mode is a prediction mode indexed 0 in the intra prediction modes shown in FIG. 2C, the DC prediction mode is a prediction mode indexed 1 in the intra prediction modes shown in FIG. 2C, and the horizontal prediction mode is a prediction mode indexed 18 in the intra prediction modes shown in FIG. 2C; and the vertical prediction mode is a prediction mode indexed 50 in the intra prediction modes shown in FIG. 2C.

It should be noted that a principle of the PDPC is to refine the prediction value according to a left reference pixel (left), a top reference pixel (top), and a top left corner reference pixel (topleft) of the current block, and then determine a residual error between the refined prediction value and a value of the corresponding pixel in the current block.

Figure 2D:
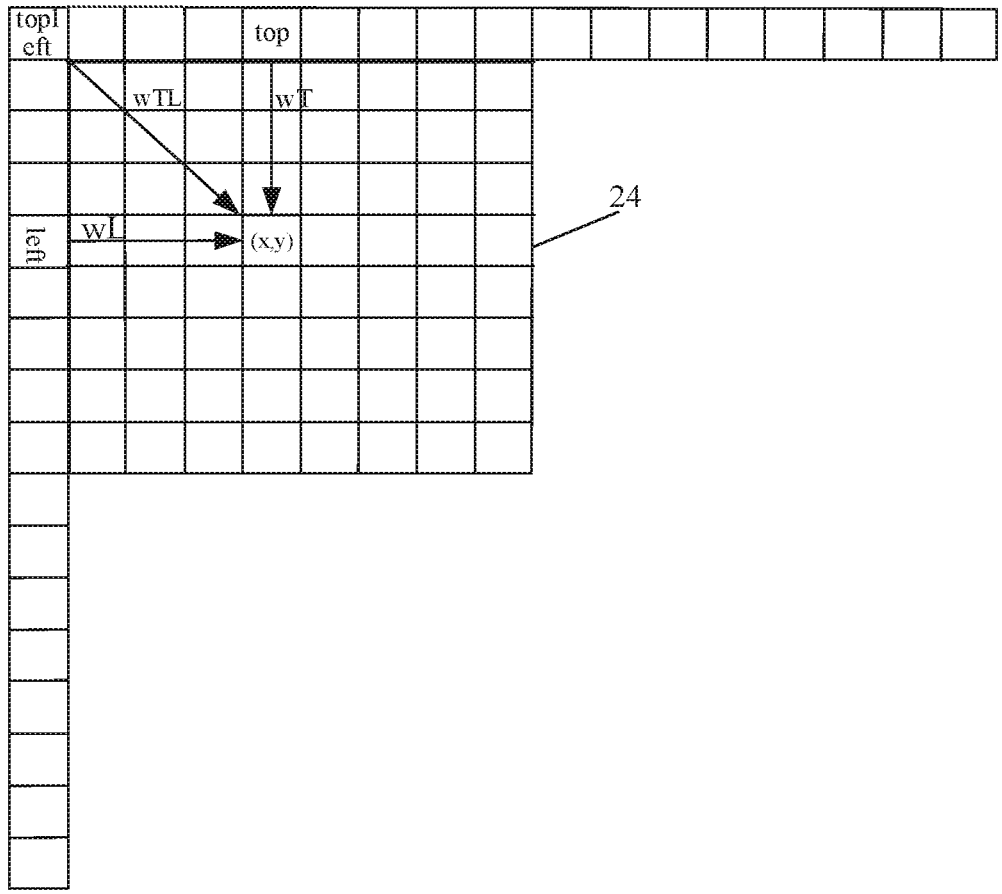
FIG. 2D is a schematic diagram of a method for calculating PDPC in a DC prediction mode according to an implementation of the present disclosure.

For example, taking the method for calculating PDPC in the DC prediction mode as an example, as shown in FIG. 2D and Formula (1):

$$P(x,y)=(wL*P_{left}+wT*P_{top}-wTL*P_{topLeft}+(64-wL-wT+wTL)*Q(x,y)+32)>>6;$$

$$wT=32>>std::min(31,((y<<1)>>scale));$$

$$wL=32>>std::min(31,((x<<1)>>scale));$$

$$wTL=(wL>>4)+(wT>>4); \quad (1).$$

According to a value of a reconstructed pixel on the left reference pixel left, a distance between the left and a current point in the current block 24 (which may be represented by a weight wL), a value of a reconstructed pixel on the top reference pixel (top), a distance between the top and the current point (which may be represented by the weight wT), a value of a reconstructed pixel on the top left corner reference pixel topleft, and a distance between the topleft and the current point (which may be represented by a weight wTL), of a current block 24, the prediction value of the current point is refined to obtain the refined prediction value.

Implementations of the present disclosure will be elaborated below with reference to the accompanying drawings. The method for processing information according to an implementation of the present disclosure may be applied to both the video encoder 21 and the video decoder 22, which is not specifically limited in an implementation of the present disclosure.

An implementation of the present disclosure provides a method for processing information, wherein the method is applied to the video encoder 21 of the electronic device. Functions implemented by the method may be realized by calling program codes by a processor in the electronic device. Of course, the program codes may be stored in a computer storage medium. It may be seen that the electronic device at least includes the processor and a storage medium.

Figure 3A:
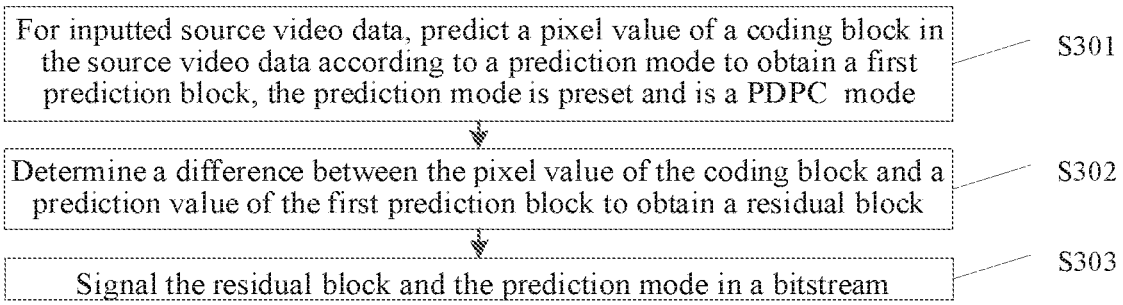
FIG. 3A is a schematic diagram of an implementation process of a method for processing information according to an implementation of the present disclosure.

FIG. 3A is a schematic diagram of an implementation process of a method for processing information according to an implementation of the present disclosure. As shown in FIG. 2, the method includes following acts 301 to 303.

In the act S301, for inputted source video data, a colour component of a coding block in the source video data is predicted according to a prediction mode to obtain a first prediction block, wherein the prediction mode is preset and is a PDPC mode.

In another implementation, the colour component is a chroma value or a luma value. It should be noted that a prediction mode used when predicting the current block (including the coding block and the coding block) before using the PDPC is defined as the PDPC mode. For example, in VTM5.0, the PDPC mode includes a planar prediction mode, a DC prediction mode, a horizontal prediction mode, a vertical prediction mode, an angular prediction mode with an index smaller than or equal to 10 (including the wide-angle mode), or an angular prediction mode with an index greater than or equal to 58 (including the wide-angle mode).

It should be noted that a coding block refers to a picture area in the source video data on which prediction processing and coding processing need to be performed. In an implementation, the source video data may be obtained by a picture acquisition apparatus.

Understandably, after obtaining the first prediction block, the act S302 is directly performed to determine a difference between the colour component of the coding block and a prediction value of the first prediction block. Thus, before a residual block is determined, PDPC processing is not performed on the first prediction block, which can reduce processing complexity of intra prediction.

In the act S302, the difference between the colour component of the coding block and the prediction value of the first prediction block is determined to obtain the residual block.

In the act S303, the residual block and the prediction mode are signalled in a bitstream.

In an implementation of the present disclosure, after obtaining the first prediction block by predicting the colour component of the coding block in the source video data according to the prediction mode which is preset and is the PDPC mode, instead of refining each prediction value in the first prediction block, the difference between the prediction value of the first prediction block and the colour component of the coding block is directly determined. In this way, on the premise of ensuring video coding performance, processing complexity of intra prediction can be reduced.

Figure 3B:
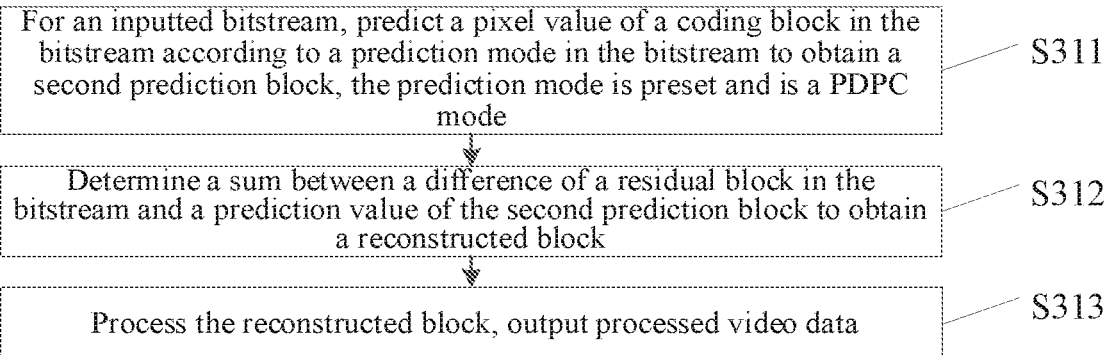
FIG. 3B is a schematic diagram of an implementation process of another method for processing information according to an implementation of the present disclosure.

An implementation of the present disclosure provides another method for processing information, wherein the method is applied to the video decoder 21 of the electronic device. FIG. 3B is a schematic diagram of an implementation process of another method for processing information according to an implementation of the present disclosure. As shown in FIG. 3B, the method includes following acts S311 to S313.

In the act S311, for an inputted bitstream, a colour component of a coding block in the bitstream is predicted according to a prediction mode in the bitstream to obtain a second prediction block; wherein, the prediction mode is preset and is a PDPC mode.

In another implementation, the colour component is a chroma value or a luma value.

In the act S312, a sum of a difference of a residual block in the bitstream and a prediction value of the second prediction block is determined to obtain a reconstructed block.

In the act S313, the reconstructed block is processed, outputting processed video data.

In an implementation of the present disclosure, according to a prediction mode in the inputted bitstream, a colour component of a coding block in the bitstream is predicted to obtain a second prediction block, wherein the prediction mode is preset and is the PDPC mode. After obtaining the second prediction block, instead of refining each prediction value in the second prediction block, a sum of a difference of a residual block in the bitstream and the prediction value of the second prediction block is directly determined, thereby obtaining the reconstructed block. In this way, on the premise of ensuring video decoding performance, processing complexity of intra prediction can be reduced.

Figure 4A:
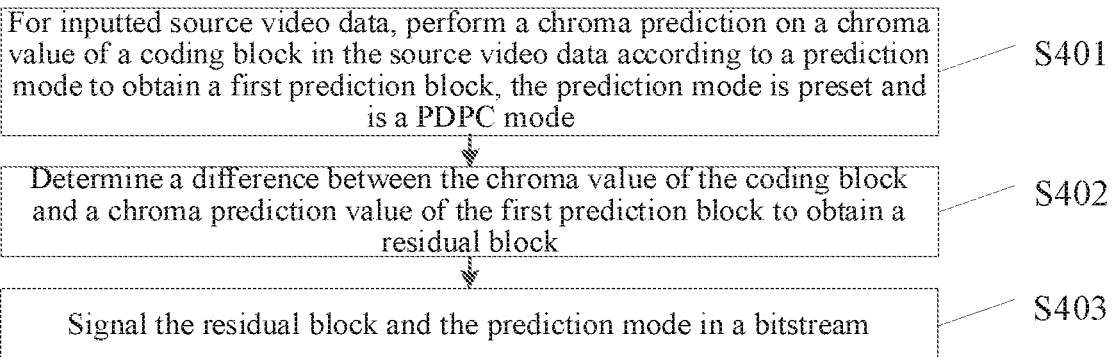
FIG. 4A is a schematic diagram of an implementation process of yet another method for processing information according to an implementation of the present disclosure.

An implementation of the present disclosure provides yet another method for processing information, wherein the method is applied to the video encoder 21 of the electronic device. FIG. 4A is a schematic diagram of an implementation process of yet another method for processing information according to an implementation of the present disclosure. As shown in FIG. 4A, and the method includes following acts S401 to S403.

In the act S401, for inputted source video data, a chroma prediction is performed on a chroma value of a coding block in the source video data according to a prediction mode to obtain a first prediction block, wherein the prediction mode is preset and is a PDPC mode.

Understandably, the improvement of video coding and decoding performance by the PDPC is based on saving coding bits and sacrificing chroma performance. Since contents of pictures reflected by luma and chroma are different, refining the first prediction block by the PDPC cannot improve performances of luma and chroma simultaneously. In an implementation of the present disclosure, when performing the chroma prediction of the coding block, after performing the chroma prediction on the chroma value of the coding block in the source video data by using the preset prediction mode, instead of refining the obtained first prediction block by using the PDPC, a chroma residual block is directly determined according to the coding block and the first prediction block.

In the act S402, a difference between the chroma value of the coding block and a chroma prediction value of the first prediction block is determined to obtain a residual block.

Here, understandably, the obtained residual block is a chroma residual block, that is, it includes the difference between the chroma value of the coding block and a luma prediction value of the first prediction block.

In the act S403, the residual block and the prediction mode are signalled in a bitstream.

In an implementation of the present disclosure, for inputted source video data, after a chroma prediction is performed on the chroma value of the coding block in the source video data according to a prediction mode which is preset and is the PDPC mode, instead of refining the prediction value of the obtained first prediction block, the residual value is directly determined. In this way, processing complexity of chroma intra prediction is reduced without affecting chroma performance.

On the basis of the aforementioned acts S401 to S403, in another implementation, the method further includes following acts S404 to S407.

In the act S404, a luma prediction is performed on a luma value of the coding block according to a prediction mode which is preset and is the PDPC mode to obtain the first prediction block.

In the act S405, the prediction value of the first prediction block is refined to obtain a first refinement block.

In the act S406, a difference between the luma value of the coding block and a corresponding refinement value of the first refinement block is determined to obtain a refinement residual block.

In the act S407, the refined residual block and the prediction mode are signalled in the bitstream.

It should be noted that in another implementation, for the luma prediction, the video encoder may also execute acts S901 to S903 in a following implementation, or execute acts S101 to S103 in a following implementation.

Figure 4B:
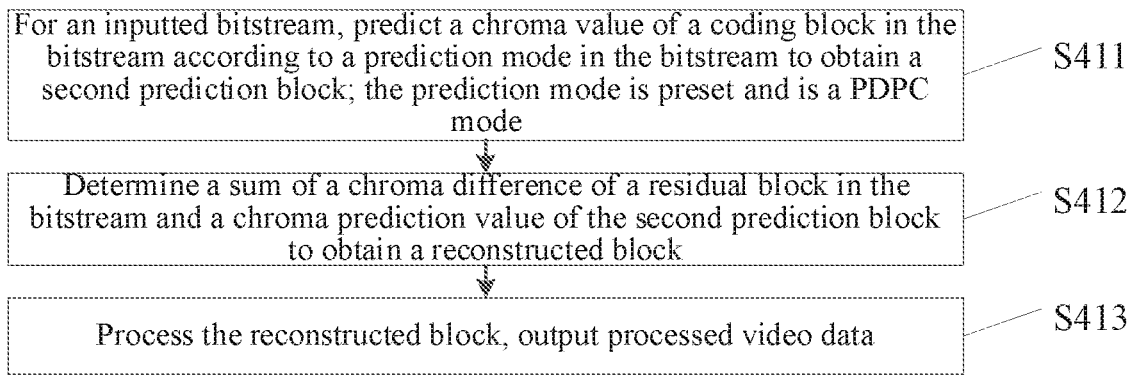
FIG. 4B is a schematic diagram of an implementation process of further another method for processing information according to an implementation of the present disclosure.

An implementation of the present disclosure provides further another method for processing information, wherein the method is applied to the video decoder 21 of the electronic device. FIG. 4B is a schematic diagram of an implementation process of further another method for processing information according to an implementation of the present disclosure. As shown in FIG. 4B, the method includes following acts S411 to S413.

In the act S411, for an inputted bitstream, a chroma value of a coding block in the bitstream is predicted according to a prediction mode in the bitstream to obtain a second prediction block; wherein the prediction mode is preset and is the PDPC mode.

In the act S412, a sum of a chroma difference of a residual block in the bitstream and a chroma prediction value of the second prediction block is determined to obtain a reconstructed block.

In the act S413, the reconstructed block is processed, outputting processed video data.

In an implementation of the present disclosure, for inputted bitstream, the chroma value of the coding block in the bitstream is predicted according to the prediction mode in the bitstream to obtain the second prediction block, wherein the prediction mode is predicted and is the PDPC mode. After obtaining the second prediction block, instead of refining the chroma prediction value of the obtained second prediction block, the residual block and the second prediction block are directly added together to obtain the reconstructed block, the reconstructed block is processed, and the processed video data is output. In this way, processing complexity of chroma intra prediction is reduced without affecting chroma performance.

Based on the aforementioned acts S411 to S413, in another implementation, the method further includes following acts S414 to S417.

In the act S414, for the inputted bitstream, a luma value of the coding block in the bitstream is predicted according to the prediction mode in the bitstream to obtain a second prediction block; wherein the prediction mode is preset and is the PDPC mode.

In the act S415, a luma prediction value of the second prediction block is refined to obtain a second refinement block.

In the act S416, a sum of a luma difference of a residual block in the bitstream and the luma prediction value of the second refinement block is determined to obtain a reconstructed block.

In the act S417, the reconstructed block is processed, outputting processed video data.

It should be noted that in another implementation, for a luma prediction, the video decoder may also execute acts S911 to S913 in a following implementation, or in another implementation, the prediction mode in act S911 is any prediction mode in any one of following first to fourth mode combinations.

Figure 5:
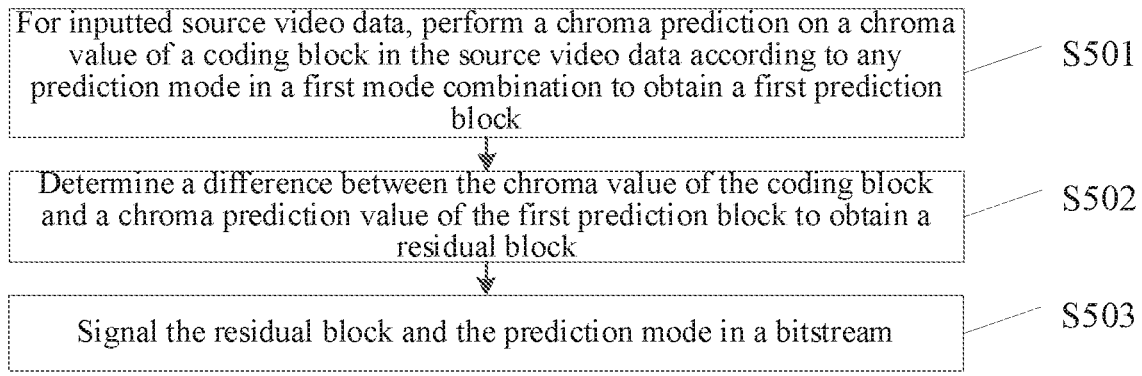
FIG. 5 is a schematic diagram of an implementation process of another method for processing information according to an implementation of the present disclosure.

An implementation of the present disclosure provides another method for processing information, wherein the method is applied to the video encoder 21 of the electronic device. FIG. 5 is a schematic diagram of an implementation process of another method for processing information according to an implementation of the present disclosure. As shown in FIG. 5, the method includes following acts S501 to S503.

In the act S501, for inputted source video data, a chroma prediction is performed on a chroma value of a coding block in the source video data according to any prediction mode in a first mode combination to obtain a first prediction block.

Herein, the first mode combination includes following PDPC modes: a prediction mode with an index smaller than a first numerical value but not the planar prediction mode or the DC prediction mode, a prediction mode with an index greater than the first numerical value and smaller than or equal to a second numerical value, a prediction mode with an index greater than or equal to a third numerical value and smaller than a fourth numerical value, and a prediction mode with an index greater than the fourth numerical value, among N preset spatial prediction modes within a component.

It should be noted that the first numerical value, the second numerical value, the third numerical value, and the fourth numerical value are usually preset mode index sequence values (that is, values of the indexes). In a preferred implementation, the N spatial prediction modes within the component are the spatial prediction modes within the 94 components shown in FIG. 2C, and the first numerical value is set to 2, the second numerical value is set to 10, the third numerical value is set to 58, and the fourth numerical value is set to 66, that is, when the chroma prediction is performed, and when any one of a prediction mode with an index smaller than 2 but not the planar prediction mode or the DC prediction mode, a prediction mode with an index greater than 2 and smaller than or equal to 10, a prediction mode with an index greater than or equal to 58 and smaller than 66, and a prediction mode with an index greater than 66, among the spatial prediction modes within these 94 components, is used, an obtained chroma prediction value is not refined by using the PDPC. In other words, only in the planar prediction mode, the DC prediction mode, the horizontal prediction mode, the vertical prediction mode, the prediction mode indexed 2, and the prediction mode indexed 66, the obtained chroma prediction value is refined by using the PDPC.

In the act S502, a difference between the chroma value of the coding block and the chroma prediction value of the first prediction block is determined to obtain a residual block.

In the act S503, the residual block and the prediction mode are signalled in a bitstream.

In an implementation of the present disclosure, when the chroma prediction is performed of the coding block by using the prediction mode in the first mode combination, instead of refining the obtained chroma prediction value by using the PDPC, the difference between the chroma prediction value and the chroma value of the coding block is directly determined. In this way, on the basis of ensuring chroma prediction performance, processing complexity of chroma prediction is reduced.

On the basis of the aforementioned acts S501 to S503, in another implementation, the method further includes the aforementioned acts S403 to S407.

It should be noted that in another implementation, for a luma prediction, acts S901 to S903 in a following implementation may also be performed, or acts S101 to S103 in a following implementation may be performed.

It should also be noted that for the inputted bitstream, the video decoder may execute decoding acts which are symmetrical with the above acts S501 to S503, which is not repeated here. In another implementation, for the luma prediction, the video decoder may also perform acts S911 to S913 in a following implementation, or in another implementation, the prediction mode in act S911 is any prediction mode in any one of the first to fourth mode combinations.

Figure 6:
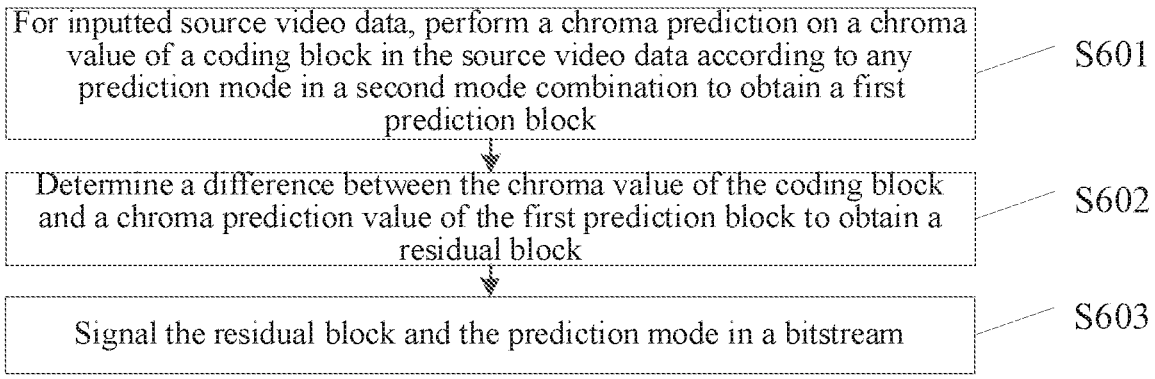
FIG. 6 is a schematic diagram of an implementation process of yet another method for processing information according to an implementation of the present disclosure.

An implementation of the present disclosure provides yet another method for processing information, wherein the method is applied to the video encoder 21 of the electronic device. FIG. 6 is a schematic diagram of an implementation process of yet another method for processing information according to an implementation of the present disclosure. As shown in FIG. 6, the method includes following acts S601 to S603.

In the act S601, for inputted source video data, a chroma prediction is performed on a chroma value of a coding block in the source video data according to any prediction mode in the second mode combination to obtain a first prediction block. Wherein the second mode combination includes following PDPC modes: a prediction mode with an index smaller than or equal to a second numerical value but not the planar prediction mode or the DC prediction mode, and a prediction mode with an index greater than or equal to a third numerical value, among N preset spatial prediction modes within a component.

It should be noted that the second numerical value and the third numerical value are usually preset mode index sequence values (that is, values of the indexes). In a preferred implementation, the N spatial prediction modes within the component are the spatial prediction modes within the 94 components shown in FIG. 2C, and the second numerical value is set to 10, and the third numerical value is set to 58. That is, when the chroma prediction is performed, and when any one of a prediction mode with an index smaller than or equal to 10 but not the planar prediction mode or the DC prediction mode, and a prediction mode with an index greater than or equal to 58, among the spatial prediction modes within these 94 components, is used, an obtained chroma prediction value is not refined by using the PDPC. In this way, processing complexity of chroma prediction can be reduced. In other words, only in the planar prediction mode, the DC prediction mode, the horizontal prediction mode, and the vertical prediction mode, the obtained chroma prediction value is refined by using the PDPC.

For another example, in another preferred implementation, the N spatial prediction modes within the component are the spatial prediction modes within the 94 components shown in FIG. 2C, and the second numerical value is set to 8, and the third numerical value is set to 60.

In the act S602, the difference between the chroma value of the coding block and the chroma prediction value of the first prediction block is determined to obtain a residual block.

In the act S603, the residual block and the prediction mode are signalled in a bitstream.

In an implementation of the present disclosure, when any prediction mode in the second mode combination is used to predict the coding block, a residual value is directly determined without refining the prediction value. In this way, on the premise of not affecting luma coding performance basically, chroma coding performance is improved. Experimental data show that a performance of a Y component is lost by 0.03%; a performance of a U component is increased by 0.16%, and a performance of a V component is increased by 0.14%. It can be seen that the performance loss of the Y component is basically unchanged; and performance improvement of the U component and performance improvement of the V component are obviously improved.

It should be noted that, based on the aforementioned acts S601 to S603, in another implementation, the method further includes the aforementioned acts S403 to S407. Or, in another implementation, for a luma prediction, acts S901 to S903 in a following implementation may also be performed, or acts S101 to S103 in a following implementation may be performed.

It should also be noted that, for an inputted bitstream, the video decoder may execute decoding acts which are symmetrical with the above acts S601 to S603, which will not be repeated here. In another implementation, for the luma prediction, acts S911 to S913 in a following implementation may also be performed, and in another implementation, the prediction mode in act S911 is any prediction mode in any one of the first to fourth mode combinations.

Figure 7:
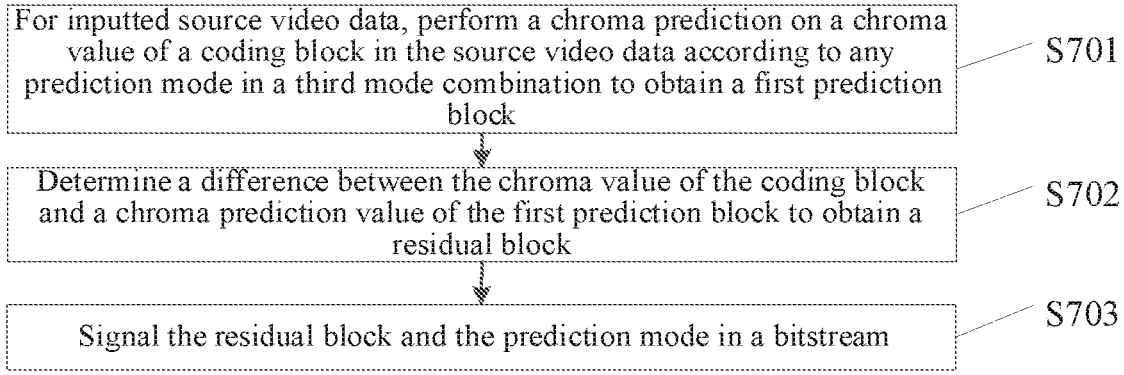
FIG. 7 is a schematic diagram of an implementation process of further another method for processing information according to an implementation of the present disclosure.

An implementation of the present disclosure provides further another method for processing information, wherein the method is applied to the video encoder 21 of the electronic device. FIG. 7 is a schematic diagram of an implementation process of further another method for processing information according to an implementation of the present disclosure. As shown in FIG. 7, the method includes following acts S701 to S703.

In the act S701, for inputted source video data, a chroma prediction is performed on a chroma value of a coding block in the source video data according to any prediction mode in the third mode combination to obtain a first prediction block. Wherein the third mode combination includes following PDPC modes: the horizontal prediction mode, the vertical prediction mode, and a prediction mode with an index smaller than or equal to a second numerical value but not the planar prediction mode or the DC prediction mode, and a prediction mode with an index greater than or equal to a third numerical value, among N preset spatial prediction modes within a component.

It should be noted that the second numerical value and the third numerical value are usually preset mode index sequence values (that is, values of the indexes). In a preferred implementation, the N spatial prediction modes within the component are the spatial prediction modes within the 94 components shown in FIG. 2C, and the second numerical value is set to 10, and the third numerical value is set to 58, that is, the third mode combination includes following PDPC modes: the horizontal prediction mode, the vertical prediction mode, and a prediction mode with an index smaller than or equal to 10 but not the planar prediction mode or the DC prediction mode, and a prediction mode with an index greater than or equal to 58, among the spatial prediction modes within the 94 components. In other words, only in the planar prediction mode and the DC prediction mode, an obtained chroma prediction value is refined by using the PDPC, while in the third mode combination, the obtained chroma prediction value is not refined by using the PDPC, thus reducing processing complexity of chroma prediction.

In the act S702, a difference between the chroma value of the coding block and the chroma prediction value of the first prediction block is determined to obtain a residual block.

In the act S703, the residual block and the prediction mode are signalled in a bitstream.

It should be noted that, based on the aforementioned acts S701 to S703, in another implementation, the method further includes the aforementioned acts S403 to S407. Or, in another implementation, for a luma prediction, acts S901 to S903 in a following implementation may also be performed, or acts S101 to S103 in a following implementation may be performed.

It should also be noted that, for an inputted bitstream, the video decoder executes decoding acts which are symmetrical with the above acts S701 to S703, which will not be repeated here. In another implementation, for the luma prediction, the video decoder may also execute the above acts S414 to S417, or execute acts S911 to S913 in a following implementation, or in another implementation, the prediction mode in act S911 is any prediction mode in any one of the first to fourth mode combinations.

Figure 8:
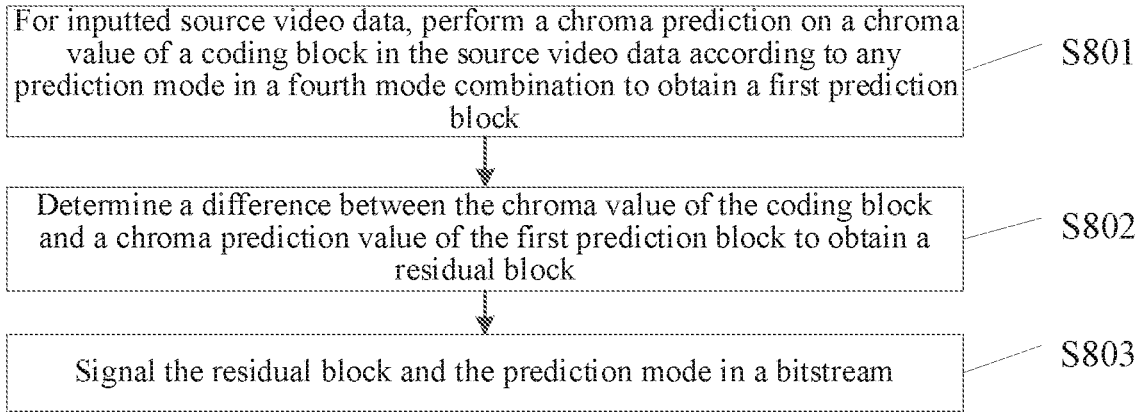
FIG. 8 is a schematic diagram of an implementation process of another method for processing information according to an implementation of the present disclosure.

An implementation of the present disclosure provides another method for processing information, wherein the method is applied to the video encoder 21 of the electronic device. FIG. 8 is a schematic diagram of an implementation process of another method for processing information according to an implementation of the present disclosure. As shown in FIG. 8, the method includes following acts S801 to S803.

In the act S801, for inputted source video data, a chroma prediction is performed on a chroma value of a coding block in the source video data according to any prediction mode in a fourth mode combination to obtain a first prediction block. Wherein the fourth mode combination includes following PDPC modes: the horizontal prediction mode, the vertical prediction mode, and a prediction mode with an index smaller than or equal to a second numerical value and including the planar prediction mode and the DC prediction mode, and a prediction mode with an index greater than or equal to a third numerical value, among N preset spatial prediction modes within a component.

It should be noted that the second numerical value and the third numerical value are usually preset mode index sequence values (that is, values of the indexes). In a preferred implementation, the N spatial prediction modes within the component are the spatial prediction modes within the 94 components shown in FIG. 2C, and the second numerical value is set to 10, and the third numerical value is set to 58, that is, the fourth mode combination includes following PDPC modes: the horizontal prediction mode, the vertical prediction mode, and a prediction mode with an index smaller than or equal to 10, and a prediction mode with an index greater than or equal to 58, among the N spatial prediction modes within the component. In other words, when a chroma prediction is performed in all PDPC modes, an obtained chroma prediction value is not refined by using the PDPC.

In the act S802, a difference between the chroma value of the coding block and the chroma prediction value of the first prediction block is determined to obtain a residual block.

In the act S803, the residual block and the prediction mode are signalled in a bitstream.

It should be noted that, based on the aforementioned acts S801 to S803, in another implementation, the method also includes acts S401 to S403, or acts S501 to S503, or acts S601 to S603, or acts S701 to S703 in the above implementations, or following acts S901 to S903.

It should also be noted that, for an inputted bitstream, the video decoder may execute decoding acts which are symmetrical with the above acts S801 to S803, which is not repeated here. In another implementation, for a luma prediction, the video decoder may also perform acts S414 to S417 above, or perform acts S911 to S914 in following implementations, or in another implementation, a prediction mode in act S911 is any prediction mode in any of the first to fourth mode combinations.

Figure 9A:
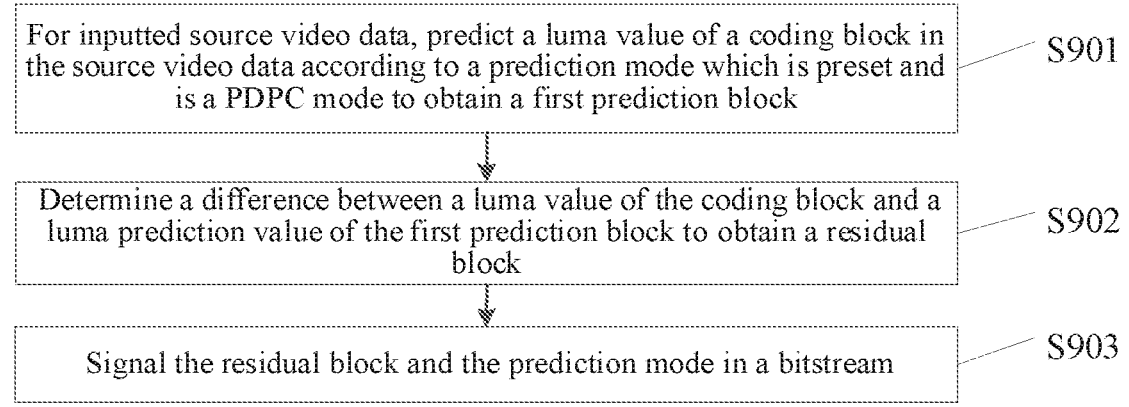
FIG. 9A is a schematic diagram of an implementation process of yet another method for processing information according to an implementation of the present disclosure.

An implementation of the present disclosure provides yet another method for processing information, wherein the method is applied to the video encoder 21 of the electronic device. FIG. 9 is a schematic diagram of an implementation process of yet another method for processing information according to an implementation of the present disclosure. As shown in FIG. 9A, the method includes following acts S901 to S903.

In the act S901, for inputted source video data, a luma value of a coding block in the source video data is predicted according to the prediction mode which is preset and is the PDPC mode to obtain a first prediction block.

In the act S902, a difference between a luma value of the coding block and a luma prediction value of the first prediction block is determined to obtain a residual block.

In the act S903, the residual block and the prediction mode are signalled in a bitstream.

In an implementation of the present disclosure, when the luma value of the coding block is predicted according to the prediction mode which is preset and is the PDPC mode, the obtained luma prediction value is not refined by using the PDPC, so that processing complexity of luma prediction can be reduced.

It should be noted that, based on the aforementioned acts S901 to S903, in another implementation, the method also includes acts S401 to S403, or acts S501 to S503, or acts S601 to S603, or acts S701 to S703, or acts S801 to S803 in the above implementations.

Figure 9B:
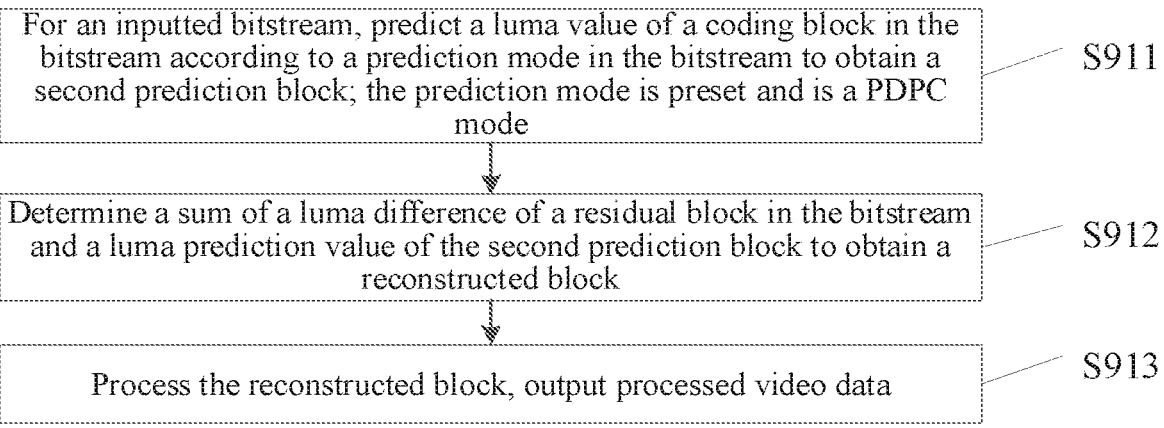
FIG. 9B is a schematic diagram of an implementation process of further another method for processing information according to an implementation of the present disclosure.

An implementation of the present disclosure provides further another method for processing information, wherein the method is applied to the video decoder 21 of the electronic device. FIG. 9B is a schematic diagram of an implementation process of further another method for processing information according to an implementation of the present disclosure. As shown in FIG. 9B, the method includes following acts S911 to S913.

In the act S911, for an inputted bitstream, a luma value of a coding block in the bitstream is predicted according to a prediction mode in the bitstream to obtain a second prediction block; wherein the prediction mode is preset and is the PDPC mode.

In another implementation, the prediction mode in act S911 is any prediction mode in any of the first to fourth mode combinations.

In the act S912, a sum of a luma difference of a residual block in the bitstream and a luma prediction value of the second prediction block is determined to obtain a reconstructed block.

In the act S913, the reconstructed block is processed, outputting processed video data.

Figure 10:
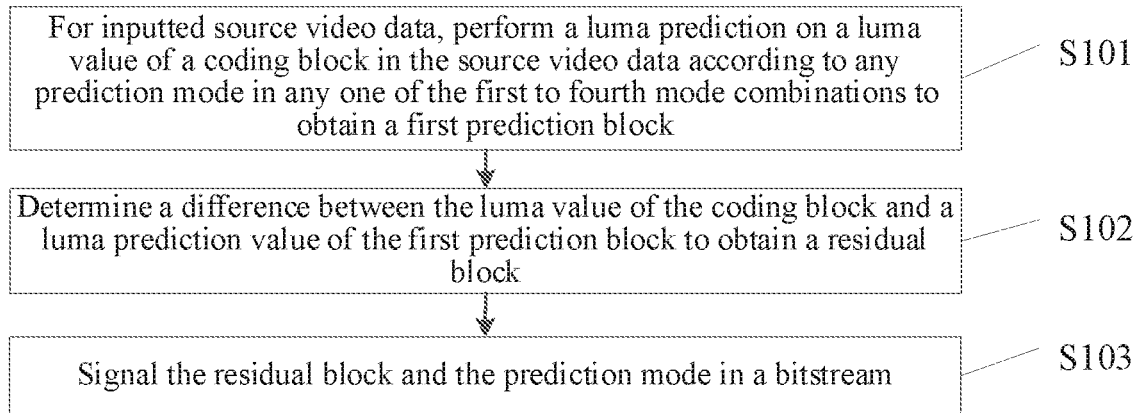
FIG. 10 is a schematic diagram of an implementation process of another method for processing information according to an implementation of the present disclosure.

An implementation of the present disclosure provides another method for processing information, wherein the method is applied to the video encoder 21 of the electronic device. FIG. 10 is a schematic diagram of an implementation process of another method for processing information according to an implementation of the present disclosure. As shown in FIG. 10, the method includes following acts S101 to S103.

In the act S101, for inputted source video data, a luma prediction is performed on a luma value of a coding block in the source video data according to any prediction mode in any one of the first to fourth mode combinations to obtain the first prediction block.

In the act S102, a difference between the luma value of the coding block and a luma prediction value of the first prediction block is determined to obtain a residual block.

In the act S103, the residual block and the prediction mode are signalled in a bitstream.

It should be noted that, based on the aforementioned acts S101 to S103, in another implementation, the method also includes acts S401 to S403, or acts S501 to S503, or acts S601 to S603, or acts S701 to S703, or acts S801 to S803 in the above implementations.

Figure 11A:
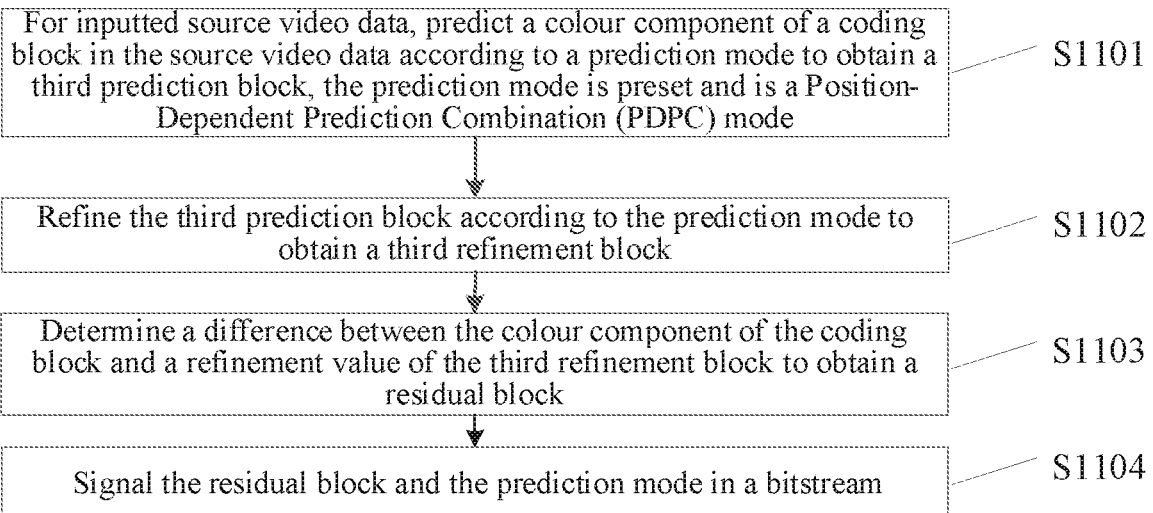
FIG. 11A is a schematic diagram of an implementation process of yet another method for processing information according to an implementation of the present disclosure.

An implementation of the present disclosure provides yet another method for processing information, wherein the method is applied to the video encoder 21 of the electronic device. FIG. 11A is a schematic diagram of an implementation process of yet another method for processing information according to an implementation of the present disclosure. As shown in FIG. 11A, the method includes following acts S1101 to S1104.

In the act S1101, for inputted source video data, a colour component of a coding block in the source video data is predicted according to a prediction mode to obtain a third prediction block, wherein the prediction mode is preset and is the PDPC mode.

In another implementation, the colour component is a luma value or a chroma value.

In the act S1102, the third prediction block is refined according to the prediction mode to obtain a third refinement block.

In the act S1103, a difference between the colour component of the coding block and a refinement value of the third refinement block is determined to obtain a residual block.

In the act S1104, the residual block and the prediction mode are signalled in a bitstream.

In another implementation, for the act S1101, the colour component of the coding block in the source video data is predicted according to the prediction mode to obtain the third prediction block, which includes: a chroma prediction is performed on the chroma value of the coding block according to any prediction mode in a fifth mode combination to obtain the third prediction block; wherein the fifth mode combination includes following PDPC modes: the planar prediction mode, the DC prediction mode, the horizontal prediction mode, the vertical prediction mode, a prediction mode with an index being a first numerical value among N preset spatial prediction modes within a component, and a prediction mode with an index being a fourth numerical value among the N preset spatial prediction modes within a component.

In another implementation, for the act S1101, the colour component of the coding block in the source video data is predicted according to the prediction mode to obtain the third prediction block, which includes: the colour component of the coding block is predicted according to the prediction mode to obtain the third prediction block, when following cases 1 to 4 are all met.

In the case 1, when the coding block is a luma block, and an Intra Sub-Partitions is not used; or, the coding block is a chroma block.

In the case 2, when the coding block is a luma block, and a 0th reference line is used for prediction; or, the coding block is a chroma block; wherein the 0th reference line refers to a reference line closest to the coding block.

In the case 3, the coding block is not coded by using a Block-based Delta Pulse Code Modulation (BDPCM).

In the case 4, any of following conditions is met: the prediction mode is a horizontal prediction mode; the prediction mode is a vertical prediction mode; the prediction mode is a prediction mode with an index being the first numerical value among the N preset spatial prediction modes within a component; the prediction mode is a prediction mode with the index being the fourth numerical value; the prediction mode is a prediction mode with the index smaller than or equal to a second numerical value, and the coding block is not a chroma block; or, the prediction mode is a prediction mode with the index greater than or equal to a third numerical value, and the coding block is not a chroma block.

In another implementation, for the act S1101, the colour component of the coding block in the source video data is predicted according to the prediction mode to obtain the third prediction block, which includes: a chroma prediction is performed on the chroma value of the coding block according to any prediction mode in a sixth mode combination to obtain the third prediction block; wherein the sixth mode combination includes following PDPC modes: the planar prediction mode, the DC prediction mode, the horizontal prediction mode, and the vertical prediction mode.

In another implementation, for the act S1101, the colour component of the coding block in the source video data is predicted according to the prediction mode to obtain the third prediction block, which includes: the colour component of the coding block is predicted according to the prediction mode to obtain the third prediction block, when following cases 1 to 4 are all met.

In the case 1, when the coding block is a luma block, and the Intra Sub-Partitions is not used; or, the coding block is a chroma block.

In the case 2, when the coding block is a luma block, the 0th reference line is used for prediction; or, the coding block is a chroma block; wherein the 0th reference line refers to the reference line closest to the coding block.

In the case 3, the coding block is not coded by using the BDPCM.

In the case 4, any of following conditions is met: the prediction mode is the planar prediction mode; the prediction mode is the DC prediction mode; the prediction mode is the horizontal prediction mode; the prediction mode is the vertical prediction mode; the prediction mode is a prediction mode with the index smaller than or equal to the second numerical value, and the coding block is not a chroma block; or, the prediction mode is a prediction mode with the index greater than or equal to the third numerical value, and the coding block is not a chroma block.

In another implementation, for the act S1101, the colour component of the coding block in the source video data is predicted according to the prediction mode to obtain the third prediction block, which includes: a chroma prediction is performed on the chroma value of the coding block according to any prediction mode in a seventh mode combination to obtain the third prediction block; wherein the seventh mode combination includes following PDPC modes: the planar prediction mode, and the DC prediction mode.

In another implementation, for the act S1101, the colour component of the coding block in the source video data is predicted according to the prediction mode to obtain the third prediction block, which includes: the colour component of the coding block is predicted according to the prediction mode to obtain the third prediction block, when following cases 1 to 4 are all met.

In the case 1, when the coding block is a luma block, and the Intra Sub-Partitions is not used; or, the coding block is a chroma block.

In the case 2, when the coding block is a luma block, the 0th reference line is used for prediction; or, the coding block is a chroma block; wherein the 0th reference line refers to the reference line closest to the coding block.

In the case 3, the coding block is not coded by using the BDPCM.

In the case 4, any of following conditions is met: the prediction mode is the planar prediction mode; the prediction mode is the DC prediction mode; the prediction mode is the horizontal prediction mode, and the coding block is not a chroma block; the prediction mode is the vertical prediction mode, and the coding block is not a chroma block; the prediction mode is a prediction mode with the index smaller than or equal to the second numerical value, and the coding block is not a chroma block; or, the prediction mode is a prediction mode with the index greater than or equal to the third numerical value, and the coding block is not a chroma block.

In another implementation, for the act S1101, the colour component of the coding block in the source video data is predicted according to the prediction mode to obtain the third prediction block, which includes: when following cases 1 to 4 are all met, the colour component of the coding block is predicted according to the prediction mode to obtain the third prediction block.

In the case 1, the coding block is a luma block, and the Intra Sub-Partitions is not used.

In the case 2, the coding block is a luma block, and the 0th reference line is used for prediction; wherein the 0th reference line refers to the reference line closest to the coding block.

In the case 3, the coding block is not coded by using the BDPCM.

In the case 4, any of following conditions is met: the prediction mode is the planar prediction mode; the prediction mode is the DC prediction mode; the prediction mode is the horizontal prediction mode; the prediction mode is the vertical prediction mode; the prediction mode is a prediction mode with the index smaller than or equal to the second numerical value; or, the prediction mode is a prediction mode with the index greater than or equal to the third numerical value.

Figure 11B:
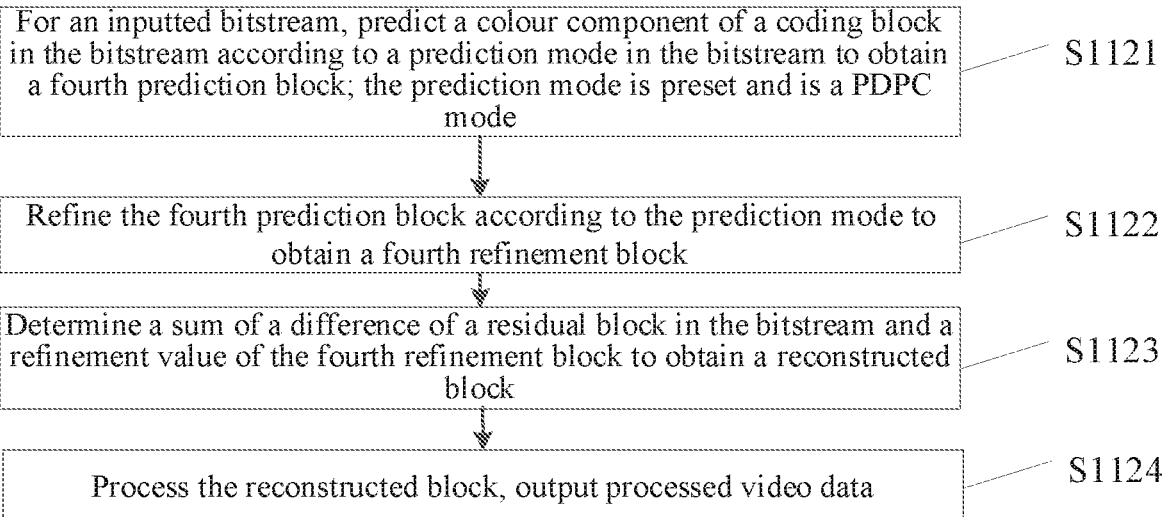
FIG. 11B is a schematic diagram of an implementation process of further another method for processing information according to an implementation of the present disclosure.

An implementation of the present disclosure provides further another method for processing information, wherein the method is applied to the video decoder 21 of the electronic device. FIG. 11B is a schematic diagram of an implementation process of further another method for processing information according to an implementation of the present disclosure. As shown in FIG. 11B, the method includes following acts S1121 to S1124.

In the act S1121, for an inputted bitstream, a colour component of a coding block in the bitstream is predicted according to a prediction mode in the bitstream to obtain a fourth prediction block; wherein the prediction mode is preset and is a PDPC mode.

In another implementation, the colour component is a chroma value or a luma value.

In the act S1122, the fourth prediction block is refined according to the prediction mode to obtain a fourth refinement block.

In the act S1123, a sum of a difference of a residual block in the bitstream and a refinement value of the fourth refinement block is determined to obtain a reconstructed block.

In the act S1124, the reconstructed block is processed, outputting processed video data.

In VTM5.0, the PDPC is applied to the planar prediction mode, the DC prediction mode, the horizontal prediction mode, the vertical prediction mode, and an angular prediction mode with an index smaller than or equal to 10 and an angular prediction mode with an index greater than or equal to 58 among the N spatial prediction modes within the component, in luma block and chroma block prediction modes simultaneously, that is, after predicting a current block by using these prediction modes, a prediction value obtained by the prediction will be refined by using the PDPC.

In VTM5.0, it is stipulated that when all following cases (101) to (104) are met, the PDPC is used.

(101) When the current block is a luma block, the Intra Sub-Partitions (ISP) is not used; or, the current block is a chroma block.

(102) When the current block is a luma block, a 0th reference line is used for prediction; or, the current block is a chroma block; wherein the 0th reference line refers to a reference line closest to the current block.

(103) The current block is not coded by using a Block-based Delta Pulse Code Modulation (BDPCM).

(104) any of following conditions is met: the prediction mode is the planar prediction mode, the DC prediction mode, the horizontal prediction mode, the vertical prediction mode, the angular prediction mode with the index smaller than or equal to 10, or the angular prediction mode with the index greater than or equal to 58.

However, an improvement of coding and decoding performance by using the PDPC is built on the basis of saving coding bits and sacrificing chroma performance. Since picture contents reflected by luma and chroma are different, PDPC technology cannot improve performances of luma and chroma simultaneously, and should not use the same PDPC for luma and chroma in a unified mode.

Based on this, the contents involved in the above-mentioned implementations will be described below in combination with multiple preferred implementations.

An implementation of the present disclosure provides a method for modifying the PDPC mode, which reduces chroma prediction modes using PDPC, after this limitation, time complexity will be reduced, and at the same time, chroma coding performance is improved. For ease of understanding, the detailed description is as follows.

PDPC modes in related technologies are same in luma and chroma, and they all use the planar prediction mode, the DC prediction mode, the horizontal prediction mode, the vertical prediction mode, the angular prediction mode with the index smaller than or equal to 10, or the angular prediction mode with the index greater than or equal to 58.

In an implementation of the present disclosure, the chroma prediction is modified as, when a chroma prediction is performed on a current block by using any one of a prediction mode with an index smaller than or equal to 10 but not the planar prediction mode or the DC prediction mode, and a prediction mode with an index greater than or equal to 58, among the spatial prediction modes within the 94 components shown in FIG. 2C, an obtained chroma prediction value is not refined by using the PDPC. In other words, when the chroma prediction is performed on the current block, the chroma prediction mode using PDPC is reduced as, PDPC is used only for the planar prediction mode, the DC prediction mode, the horizontal prediction mode or the vertical prediction mode; and when the luma prediction is performed on the current block, the luma prediction modes using PDPC are still the planar prediction mode, the DC prediction mode, the horizontal prediction mode, the vertical prediction mode, and the angular prediction mode with the index smaller than or equal to 10 and the angular prediction mode with the index greater than or equal to 58 among the spatial prediction modes within the 94 components, that is, the luma prediction modes using PDPC keep unchanged.

Accordingly, syntax semantics in VTM5.0 are modified, that is, the mode using PDPC is limited as follows: PDPC is used when following cases (201) to (204) are all met.

(201) When the current block is a luma block, the ISP partition is not used; or, the current block is a chroma block.

(202) When the current block is a luma block, the 0th reference line is used for prediction; or, the current block is a chroma block.

(203) The current block is not coded by using the BDPCM.

(204) Any of following conditions is met: the prediction mode is the planar prediction mode, the DC prediction mode, the horizontal prediction mode, the vertical prediction mode, the angular prediction mode with the index being smaller than or equal to 10 and the current block being not the chroma block, or the angular prediction mode with the index being greater than or equal to 58 and the current block being not the chroma block.

The above method for modifying the PDPC mode provided by an implementation of the present disclosure can obtain following beneficial effects on the premise of basically not affecting performance.

In a first aspect, it can improve chroma coding performance on the premise of basically not affecting luma coding performance. Experimental data show that a performance of a Y component is lost by 0.03%; a performance of a U component is improved by 0.16%, and a performance of a V component is increased by 0.14%. It can be seen that the performance loss of the Y component is basically unchanged; and the performance improvement of the U component and the performance improvement of the V component are obviously improved.

In a second aspect, complexity can be reduced. There are relatively many application scenarios of PDPC in related technologies. By using the method provided by an implementation of the present disclosure, the chroma prediction modes using PDPC can be reduced to 4 chroma prediction modes, thereby saving processing complexity, and finally decoding time is greatly shortened.

A protection point of an implementation of the present disclosure is to modify a usage scenario of PDPC in a chroma prediction. No matter PDPC is used only for the planar prediction mode, the DC prediction mode, the horizontal prediction mode, and the vertical prediction mode in the chroma prediction modes in a main solution, or part of the chroma prediction modes in an alternative solution are prohibited from using PDPC, it is to reduce the prediction modes using PDPC under the chroma prediction, reduce complexity of algorithm, and improve coding performance of chroma. Herein, alternative solutions mainly include following solutions.

Alternative Solution 1:

The chroma prediction is modified as, when the chroma prediction is performed on the current block by using any one of the horizontal prediction mode, the vertical prediction mode, and a prediction mode with an index smaller than or equal to 10, and a prediction mode with an index greater than or equal to 58, among the spatial prediction modes within the 94 components shown in FIG. 2C, an obtained chroma prediction value is not refined by using the PDPC. That is, all chroma prediction modes are prohibited from using PDPC, while the luma prediction mode using PDPC keeps unchanged when the luma prediction is performed on the current block.

Accordingly, syntax semantics in VTM5.0 are modified as, PDPC is used when following cases (301) to (305) are all met.

(301) The current block is a luma block.

(302) For the current block, ISP is not used.

(303) The current block is predicted using the 0th reference line.

(304) The current block is not coded by using the BDPCM.

(305) Any of following conditions is met: the prediction mode is the planar prediction mode, the DC prediction mode, the horizontal prediction mode, the vertical prediction mode, the angular prediction mode with the index smaller than or equal to 10, or the angular prediction mode with the index greater than or equal to 58.

Alternative Solution 2:

The chroma prediction is modified as, when the chroma prediction is performed on the current block by using any one of the horizontal prediction mode, the vertical prediction mode, and the prediction mode with the index smaller than or equal to 10 but not the planar prediction mode or the DC prediction mode, and the prediction mode with the index greater than or equal to 58, among the spatial prediction modes within the 94 components, an obtained chroma prediction value is not refined by using the PDPC. In other words, when the chroma prediction is performed, PDPC is used only in the planar prediction mode and the DC prediction mode; when the luma prediction is performed on the current block, the luma prediction mode using PDPC keeps unchanged.

Accordingly, syntax semantics in VTM5.0 are modified as, PDPC is used when following conditions (401) to (404) are all met.

(401) When the current block is a luma block, the ISP partition is not used; or, the current block is a chroma block.

(402) When the current block is a luma block, the 0th reference line is used for prediction; or, the current block is a chroma block.

(403) The current block is not coded by using the BDPCM.

(404) Any of following conditions is met: the prediction mode is the planar prediction mode, the DC prediction mode, the horizontal prediction mode with the current block being not the chroma block, the vertical prediction mode with the current block being not the chroma block, the angular prediction mode with the index being smaller than or equal to 10 and the current block being not the chroma block, or the angular prediction mode with the index being greater than or equal to 58 and the current block being not the chroma block.

Alternative Solution 3:

The chroma prediction is modified as, when the chroma prediction is performed on the current block by using any one of the prediction mode with the index smaller than 2 but not the planar prediction mode or the DC prediction mode, the prediction mode with the index greater than 2 and smaller than or equal to 10, the prediction mode with the index greater than or equal to 58 and smaller than 66, and the prediction mode with the index greater than 66, among the spatial prediction modes within the 94 components, an obtained chroma prediction value is not refined by using the PDPC. In other words, PDPC is used only in any one of the planar prediction mode, the DC prediction mode, the horizontal prediction mode, the vertical prediction mode, the prediction mode indexed 2, and the prediction mode indexed 66; when the luma prediction is performed on the current block, the luma prediction mode using PDPC keeps unchanged.

Accordingly, syntax semantics in VTM5.0 are modified as, PDPC is used when following cases (501) to (504) are all met.

(501) When the current block is a luma block, the ISP partition is not used; or, the current block is a chroma block.

(502) When the current block is a luma block, the 0th reference line is used for prediction; or, the current block is a chroma block.

(503) The current block is not coded by using the BDPCM.

(504) Any of following conditions is met: the prediction mode is the planar prediction mode, the DC prediction mode, the horizontal prediction mode, the vertical prediction mode, the prediction mode indexed 2, the prediction mode indexed 66, the angular prediction mode with the index being smaller than or equal to 10 and the current block being not the chroma block, or the angular prediction mode with the index being greater than or equal to 58 and the current block being not the chroma block.

Alternative Solution 4:

The chroma prediction and the luma prediction are modified as, when the chroma prediction and the luma prediction on the current block are performed by using any one of a prediction mode with an index smaller than or equal to 10 and greater than 8, and a prediction mode with an index greater than or equal to 58 and smaller than 60, among the spatial prediction modes within the 94 components, neither an obtained chroma prediction value nor a luma prediction value is refined by using the PDPC. In other words, the luma and chroma prediction modes using PDPC are reduced simultaneously.

Accordingly, syntax semantics in VTM5.0 are modified as, PDPC is used when following cases (601) to (604) are met.

(601) When the current block is a luma block, the ISP partition is not used; or, the current block is a chroma block.

(602) When the current block is a luma block, the 0th reference line is used for prediction; or, the current block is a chroma block.

(603) The current block is not coded by using the BDPCM.

(604) Any of following conditions is met: the prediction mode is the planar prediction mode, the DC prediction mode, the horizontal prediction mode, the vertical prediction mode, an angular prediction mode with an index smaller than or equal to 8, and an angular prediction mode with an index greater than or equal to 60.

Based on the foregoing implementations, an implementation of the present disclosure provides an apparatus for processing information, wherein various modules included in the apparatus and various units included in the modules may be implemented by a processor in an electronic device. Of course, they may also be implemented by a specific logic circuit. In an implementation process, the processor may be a central processing unit (CPU), a microprocessor (MPU), a digital signal processor (DSP) or a field programmable gate array (FPGA), etc.

Figure 12A:
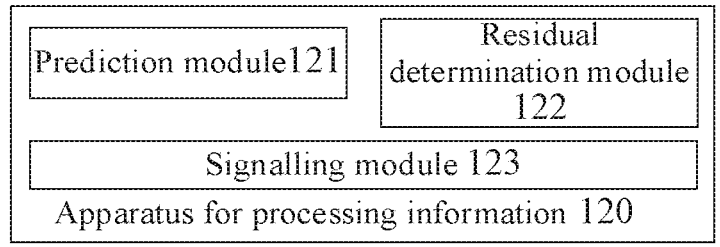
FIG. 12A is a schematic structure diagram of an apparatus for processing information according to an implementation of the present disclosure.

FIG. 12A is a schematic structure diagram of an apparatus for processing information according to an implementation of the present disclosure. As shown in FIG. 12A, the apparatus 120 for processing information includes a prediction module 121, a residual determination module 122, and a signalling module 123.

The prediction module 121 is configured to, for inputted source video data, predict a colour component of a coding block in the source video data according to a prediction mode to obtain a first prediction block, wherein the prediction mode is preset and is a PDPC mode.

The residual determination module 122 is configured to determine a difference between the colour component of the coding block and a prediction value of the first prediction block to obtain a residual block.

The signalling module 123 is configured to signal the residual block and the prediction mode in a bitstream.

In another implementation, the colour component is a luma value or a chroma value.

Figure 12B:
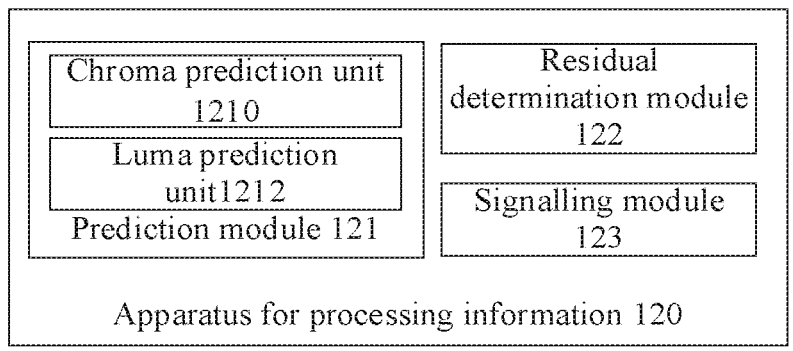
FIG. 12B is a schematic structure diagram of another apparatus for processing information according to an implementation of the present disclosure.

In another implementation, as shown in FIG. 12B, the prediction module 121 includes a chroma prediction unit 1210, configured to perform a chroma prediction on a chroma value of the coding block according to any prediction mode in a first mode combination to obtain the first prediction block. Wherein the first mode combination includes following PDPC modes: a prediction mode with an index smaller than a first numerical value but not a planar prediction mode or a DC prediction mode, a prediction mode with an index greater than the first numerical value and smaller than or equal to a second numerical value, a prediction mode with an index greater than or equal to a third numerical value and smaller than a fourth numerical value, and a prediction mode with an index greater than the fourth numerical value, among N preset spatial prediction modes within a component.

In another implementation, the chroma prediction unit 1210 is configured to perform the chroma prediction on the chroma value of the coding block according to any prediction mode in a second mode combination to obtain the first prediction block. Wherein the second mode combination includes following PDPC modes: a prediction mode with an index smaller than or equal to the second numerical value but not a planar prediction mode or a DC prediction mode, and a prediction mode with an index greater than or equal to the third numerical value, among the N preset spatial prediction modes within the component.

In another implementation, the chroma prediction unit 1210 is configured to perform the chroma prediction on the chroma value of the coding block according to any prediction mode in a third mode combination to obtain the first prediction block. Wherein the third mode combination includes following PDPC modes: a horizontal prediction mode, a vertical prediction mode, and a prediction mode with an index smaller than or equal to the second numerical value but not a planar prediction mode or a DC prediction mode, and a prediction mode with an index greater than or equal to the third numerical value, among the N preset spatial prediction modes within the component.

In another implementation, the chroma prediction unit 1210 is configured to perform the chroma prediction on the chroma value of the coding block according to any prediction mode in a fourth mode combination to obtain the first prediction block. Wherein the fourth mode combination includes following PDPC modes: the vertical prediction mode, and a prediction mode with an index smaller than or equal to the second numerical value and including a planar prediction mode and a DC prediction mode, and a prediction mode with an index greater than or equal to the third numerical value among the N preset spatial prediction modes within the component.

In another implementation, as shown in FIG. 12B, the prediction module 121 further includes a luma prediction unit 1212, configured to perform a luma prediction on a luma value of the coding block according to any prediction mode in any one of the first to fourth mode combinations to obtain the first prediction block.

Figure 13:
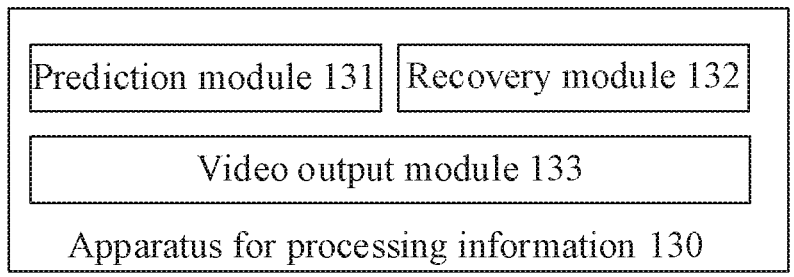
FIG. 13 is a schematic structure diagram of yet another apparatus for processing information according to an implementation of the present disclosure.

An implementation of the present disclosure provides another apparatus for processing information. FIG. 13 is a schematic structure diagram of another apparatus for processing information according to an implementation of the present disclosure. As shown in FIG. 13, the apparatus 130 for processing information includes a prediction module 131, a recovery module 132, and a video output module 133.

The prediction module 131 is configured to: for an inputted bitstream, predict a colour component of a coding block in the bitstream according to a prediction mode in the bitstream to obtain a second prediction block; wherein the prediction mode is preset and is a PDPC mode.

The recovery module 132 is configured to determine a sum of a difference of a residual block in the bitstream and a prediction value of the second prediction block to obtain a reconstructed block.

The video output module 133 is configured to process the reconstructed block and output processed video data.

In another implementation, the colour component is a chroma value or a luma value.

In another implementation, the prediction mode is any prediction mode in the first mode combination. Wherein the first mode combination the first mode combination includes following PDPC modes: a prediction mode with an index smaller than a first numerical value but not a planar prediction mode or a DC prediction mode, a prediction mode with an index greater than the first numerical value and smaller than or equal to a second numerical value, a prediction mode with an index greater than or equal to a third numerical value and smaller than a fourth numerical value, and a prediction mode with an index greater than the fourth numerical value, among N preset spatial prediction modes within a component.

In another implementation, the prediction mode is any prediction mode in the second mode combination. Wherein, the second mode combination includes following PDPC modes: a prediction mode with an index smaller than or equal to the second numerical value but not a planar prediction mode or a DC prediction mode, and a prediction mode with an index greater than or equal to the third numerical value, among the N preset spatial prediction modes within the component.

In another implementation, the prediction mode is any prediction mode in the third mode combination. Wherein the third mode combination includes following PDPC modes: a horizontal prediction mode, a vertical prediction mode, and a prediction mode with an index smaller than or equal to the second numerical value but not a planar prediction mode or a DC prediction mode, and a prediction mode with an index greater than or equal to the third numerical value, among the N preset spatial prediction modes within the component.

In another implementation, the prediction mode is any prediction mode in the fourth mode combination. Wherein the fourth mode combination includes following PDPC modes: a horizontal prediction mode, a vertical prediction mode, and a prediction mode with an index smaller than or equal to the second numerical value and including a planar prediction mode and a DC prediction mode, and a prediction mode with an index greater than or equal to the third numerical value, among the N preset spatial prediction modes within the component.

Figure 14:
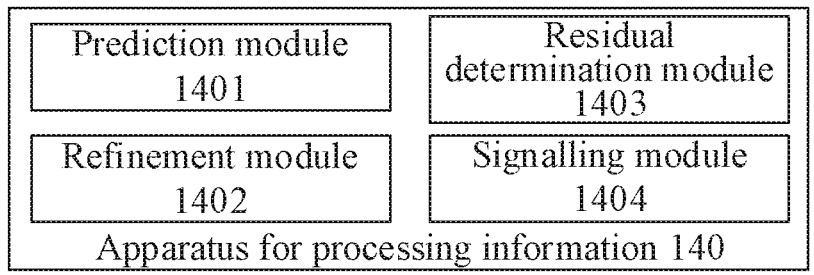
FIG. 14 is a schematic structure diagram of further another apparatus for processing information according to an implementation of the present disclosure.

An implementation of the present disclosure provides yet another apparatus for processing information. FIG. 14 is a schematic structure diagram of yet another apparatus for processing information according to an implementation of the present disclosure. As shown in FIG. 14, the apparatus 140 for processing information includes: a prediction module 1401, a refinement module 1402, a residual determination module 1403, and a signalling module 1404.

The prediction module 1401 is configured to: for inputted source video, predict a colour component of a coding block in the source video data according to a prediction mode to obtain a third prediction block, wherein the prediction mode is preset and is a PDPC mode.

The refinement module 1402 is configured to refine the third prediction block according to the prediction mode to obtain a third refinement block.

The residual determination module 1403 is configured to determine a difference between the colour component of the coding block and a refinement value of the third refinement block to obtain a residual block.

The signalling module 1404 is configured to signal the residual block and the prediction mode in a bitstream.

In another implementation, the colour component is a luma value or a chroma value.

In another implementation, the prediction module 1401 is configured to perform a chroma prediction on a chroma value of the coding block according to any prediction mode in a fifth mode combination to obtain the third prediction block. Wherein the fifth mode combination includes following PDPC modes: a planar prediction mode, a DC prediction mode, a horizontal prediction mode, a vertical prediction mode, a prediction mode with an index being a first numerical value among N preset spatial prediction modes within a component, and a prediction mode with an index being a fourth numerical value among the N preset spatial prediction modes within the component.

In another implementation, the prediction module 1401 is configured to: when following cases 1 to 4 are all met, predict the colour component of the coding block according to the prediction mode to obtain the third prediction block.

In the case 1, when the coding block is a luma block, and an Intra Sub-Partitions is not used; or, the coding block is a chroma block.

In the case 2, when the coding block is a luma block, a 0th reference line is used for prediction; or, the coding block is a chroma block; wherein the 0th reference line refers to a reference line closest to the coding block.

In the case 3, the coding block is not coded by using a Block-based Delta Pulse Code Modulation (BDPCM).

In the case 4, any of following conditions is met: the prediction mode is the horizontal prediction mode; the prediction mode is the vertical prediction mode; the prediction mode is a prediction mode with an index being the first numerical value among the N preset spatial prediction modes within a component; the prediction mode is a prediction mode with the index being the fourth numerical value; the prediction mode is a prediction mode with an index smaller than or equal to the second numerical value, and the coding block is not a chroma block; or, the prediction mode is a prediction mode with an index greater than or equal to the third numerical value, and the coding block is not a chroma block.

In another implementation, the prediction module 1401 is configured to perform the chroma prediction on the chroma value of the coding block according to any prediction mode in a sixth mode combination to obtain the third prediction block. Wherein the sixth mode combination includes following PDPC modes: the planar prediction mode, the DC prediction mode, the horizontal prediction mode, and the vertical prediction mode.

In another implementation, the prediction module 1401 is configured to: when following cases 1 to 4 are all met, predict the colour component of the coding block according to the prediction mode to obtain the third prediction block.

In the case 1, when the coding block is a luma block, and the Intra Sub-Partitions is not used; or, the coding block is a chroma block.

In the case 2, when the coding block is a luma block, the 0th reference line is used for prediction; or, the coding block is a chroma block; wherein the 0th reference line refers to the reference line closest to the coding block.

In the case 3, the coding block is not coded by using the BDPCM.

In the case 4, any of following conditions is met: the prediction mode is the planar prediction mode; the prediction mode is the DC prediction mode; the prediction mode is the horizontal prediction mode; the prediction mode is the vertical prediction mode; the prediction mode is a prediction mode with an index smaller than or equal to the second numerical value and the coding block is not a chroma block; or, the prediction mode is a prediction mode with the index greater than or equal to the third numerical value, and the coding block is not a chroma block.

In another implementation, the prediction module 1401 is configured to perform the chroma prediction on the chroma value of the coding block according to any prediction mode in a seventh mode combination to obtain the third prediction block; wherein the seventh mode combination includes following PDPC modes: a planar prediction mode, and a DC prediction mode.

In another implementation, the prediction module 1401 is configured to: when following cases 1 to 4 are all met, predict the colour component of the coding block according to the prediction mode to obtain the third prediction block.

In the case 1, when the coding block is a luma block, and the Intra Sub-Partitions is not used; or, the coding block is a chroma block.

In the case 2, when the coding block is a luma block, the 0th reference line is used for prediction; or, the coding block is a chroma block; wherein the 0th reference line refers to the reference line closest to the coding block.

In the case 3, the coding block is not coded by using the BDPCM.

In the case 4, any of following conditions is met: the prediction mode is the planar prediction mode; the prediction mode is the DC prediction mode; the prediction mode is the horizontal prediction mode, and the coding block is not a chroma block; the prediction mode is the vertical prediction mode, and the coding block is not a chroma block; the prediction mode is a prediction mode with the index smaller than or equal to the second numerical value and the coding block is not a chroma block; or, the prediction mode is a prediction mode with the index greater than or equal to the third numerical value, and the coding block is not a chroma block.

In another implementation, the prediction module 1401 is configured to: when following cases 1 to 4 are all met, predict the colour component of the coding block according to the prediction mode to obtain the third prediction block.

In the case 1, the coding block is a luma block, and an Intra Sub-Partitions is not used.

In the case 2, the coding block is a luma block, and the 0th reference line is used for prediction; wherein the 0th reference line refers to the reference line closest to the coding block.

In the case 3, the coding block is not coded by using the BDPCM.

In the case 4, any of following conditions is met: the prediction mode is the planar prediction mode; the prediction mode is the DC prediction mode; the prediction mode is the horizontal prediction mode; the prediction mode is the vertical prediction mode; the prediction mode is a prediction mode with the index smaller than or equal to the second numerical value; or, the prediction mode is a prediction mode with the index greater than or equal to the third numerical value.

Figure 15:
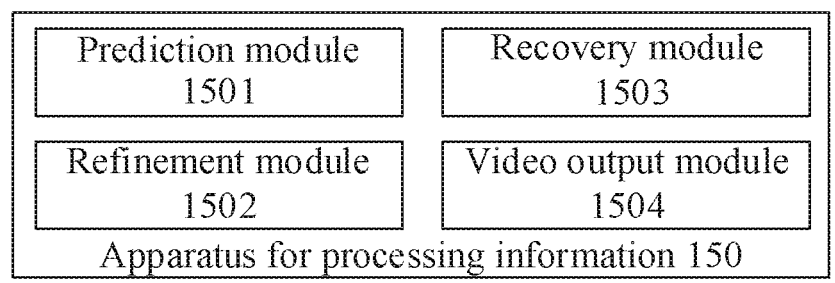
FIG. 15 is a schematic structure diagram of another apparatus for processing information according to an implementation of the present disclosure.

An implementation of the present disclosure provides further another apparatus for processing information. FIG. 15 is a schematic structure diagram of yet another apparatus for processing information according to an implementation of the present disclosure. As shown in FIG. 15, the apparatus 150 for processing information includes a prediction module 1501, a refinement module 1502, a recovery module 1503, and a video output module 1504.

The prediction module 1501 is configured to: for an inputted bitstream, predict a colour component of a coding block in the bitstream according to a prediction mode in the bitstream to obtain a fourth prediction block; wherein the prediction mode is preset and is a PDPC mode.

The refinement module 1502 is configured to refine the fourth prediction block according to the prediction mode to obtain a fourth refinement block.

The recovery module 1503 is configured to determine a sum of a difference of a residual block in the bitstream and a refinement value of the fourth refinement block to obtain a reconstructed block.

The video output module 1504 is configured to process the reconstructed block and output processed video data.

In another implementation, the colour component is a chroma value or a luma value.

The description of the above apparatus implementation is similar to the description of the above method implementation, and has similar beneficial effects as the method implementation. For technical details not disclosed in the apparatus implementation of the present disclosure, please refer to the description of the method implementation of the present disclosure to understand.

It should be noted that in the implementations of the present disclosure, if the above method for processing information is implemented in a form of a software function module, and when sold or used as an independent product, it may also be stored in a computer readable storage medium. Based on this understanding, the technical solutions of the implementations of the present disclosure, in essence, or the part contributing to the related art, may be embodied in a form of a software product. The computer software product is stored in a storage medium, and includes several instructions to make an electronic device (which may be a mobile phone, a tablet, an electronic reader, an unmanned aerial vehicle, a wearable device (such as smart glasses, or the like), a sweeping robot, a personal computer, a navigator, a video telephone, a television, a server, etc.) perform all or part of the method described in various implementations of the present disclosure. And the aforementioned storage medium includes various media which may store program codes, such as a U disk, a mobile hard disk, a Read Only Memory (ROM), a magnetic disk or an optical disk. Thus, the implementations of the present disclosure are not limited to any specific combination of hardware and software.

Figure 16:
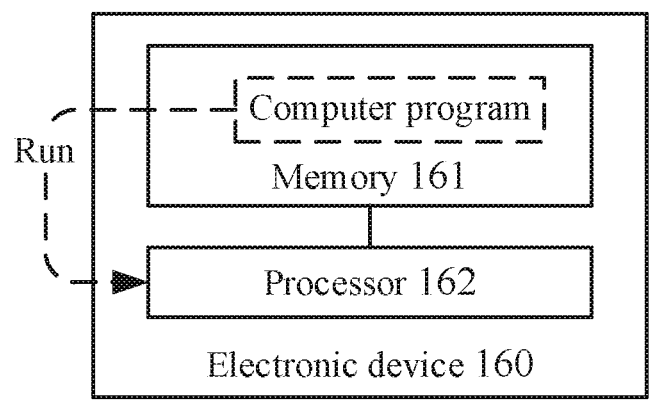
FIG. 16 is a schematic diagram of a hardware entity of an electronic device according to an implementation of the present disclosure.

Correspondingly, an implementation of the present disclosure provides an electronic device. FIG. 16 is a schematic diagram of a hardware entity of an electronic device according to an implementation of the present disclosure. As shown in FIG. 16, the electronic device 160 includes a memory 161 and a processor 162. The memory 161 stores a computer program that may be run on the processor 162, and the processor 162 implements acts in the method for processing information provided in the above implementations when executing the program.

It should be noted that the memory 161 is configured to store instructions and applications executable by the processor 162, and may also buffer data (such as picture data, audio data, voice communication data, and video communication data) to be processed or has been processed by the processor 162 and each module in the electronic device 160, which may be implemented by FLASH or a Random Access Memory (RAM).

An implementation of the present disclosure provides a computer readable storage medium, on which a computer program is stored, wherein when the computer program is executed by a processor, acts in the method for processing information provided in the above implementations are implemented.

It should be pointed out here that the descriptions of the above storage medium and the device implementation are similar to the description of the above method implementations, and they have similar beneficial effects as the method implementations. For technical details not disclosed in the storage medium and the device implementation of the present disclosure, please refer to the description of the method implementations of the present disclosure to understand.

It should be understood that "one implementation" or "an implementation" mentioned throughout the specification means that a particular feature, a structure, or a characteristic related to the implementations is included in at least one implementation of the present disclosure. Thus, "in one implementation" or "in an implementation" in the specification may not definitely refer to the same implementation. In addition, the particular features, structures, or characteristics may be combined in any suitable manner in one or more implementations. It should be understood that in various implementations of the present disclosure, sequence numbers of the various processes do not imply an order of execution of the various processes, which should be determined by their functions and internal logics, and should not constitute any limitation on implementation processes of the implementations of the present disclosure. The above-mentioned serial numbers of the implementations of the present disclosure are only for description, and do not represent superiority and inferiority of the implementations.

It should be noted that in the present disclosure, the terms "include", "contain" or any other variations thereof are intended to cover a non-exclusive inclusion, such that a process, method, article, or device that includes a list of elements includes not only those elements but also other elements not expressly listed, or further includes elements inherent to such process, method, article, or device. An element defined by a statement "include one . . . " does not exclude presence of an additional identical element in the process, the method, an article, or the apparatus that includes the element, without more limitations.

In several implementations provided by the present disclosure, it should be understood that disclosed devices and methods may be implemented in another mode. The device implementations described above are only illustrative, for example, a partition of units is only a logical function partition, and there may be other partition manners in actual implementation. For example, multiple units or components may be combined or integrated into another system, or some features may be ignored or not executed. In addition, mutual coupling or direct coupling or communication connection between various components shown or discussed may be indirect coupling or communication connection between devices or units through some interfaces, and may be electrical, mechanical or in other forms.

The above units described as separate components may or may not be physically separated, and a component shown as the unit may be or may not be a physical unit; it may be located in one place, or may be distributed over multiple network units. Some or all of the units therein may be selected according to an actual requirement to achieve a purpose of the solution of the present implementation.

In addition, various functional units in various implementations of the present disclosure may all be integrated in one processing unit, or each unit may be separately presented as one unit, or two or more units may be integrated in one unit. The above-mentioned integrated units may be implemented in a form of hardware, or in a form of hardware plus software functional units.

One ordinary skilled in the art can understand that, all or part of the acts for implementing the above method implementations may be accomplished by hardware related to program instructions, and the aforementioned program may be stored in a computer readable storage medium. The program, when executed, performs acts including the above method implementations. And the aforementioned storage media include: various media which may store program codes, such as a removable storage device, a Read Only Memory (ROM), a magnetic disk, or an optical disk, etc.

Alternatively, the integrated units described above in the present disclosure may be stored in a computer readable storage medium, if implemented in a form of software functional module and sold or used as a separate product. Based on this understanding, the technical solutions of the implementations of the present disclosure, in essence, or the part contributing to the related art, may be embodied in a form of a software product. The computer software product is stored in a storage medium, and includes several instructions to make an electronic device (which may be a mobile phone, a tablet, an electronic reader, an unmanned aerial vehicle, a wearable device (such as smart glasses, or the like), a sweeping robot, a personal computer, a navigator, a video telephone, a television, a server, etc.) perform all or part of the method described in various implementations of the present disclosure. And the aforementioned storage medium includes various media which may store program codes, such as a removable storage device, a ROM, a magnetic disk, or an optical disk, etc.

The methods disclosed in several method implementations provided in the present disclosure may be arbitrarily combined without conflict to obtain a new method implementation.

The features disclosed in several product implementations provided in the present disclosure may be arbitrarily combined without conflict to obtain a new product implementation.

The features disclosed in several method or device implementations provided in the present disclosure may be arbitrarily combined without conflict to obtain a new method implementation or device implementation.

What are described above are merely implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be the protection scope defined by the claims.

INDUSTRIAL APPLICABILITY

In an implementation of the present disclosure, for inputted source video data, a colour component of a coding block in the source video data is predicted according to a prediction mode which is preset and is a PDPC mode, after a first prediction block is obtained, each prediction value in the first prediction block is not refined, but a difference between a prediction value of the first prediction block and the colour component of the coding block is directly determined. In this way, on the premise of ensuring video coding and decoding performance, processing complexity of intra prediction can be reduced.

The invention claimed is:

1. A method for processing information, applied to a decoder, comprising:
   obtaining a prediction mode, predicting a colour component of a coding block according to the prediction mode to obtain a prediction block, wherein the prediction mode is preset and is a Position-Dependent Prediction Combination (PDPC) mode,
   wherein the colour component of the coding block is predicted according to the prediction mode to obtain the prediction block when any of the following conditions is met:
     when the coding block is a chroma block, and the prediction mode is an angular prediction mode with an index smaller than or equal to 8; or,
     when the coding block is a chroma block, and the prediction mode is an angular prediction mode with an index greater than or equal to 60;
   refining the prediction block according to the prediction mode to obtain a refinement block.

2. The method of claim 1, wherein the colour component is a luma component.

3. The method of claim 2, further comprising:
performing a luma prediction on a luma value of the coding block according to the prediction mode to obtain the prediction block.

4. The method of claim 1, wherein the colour component is a chroma component.

5. The method of claim 4, further comprising:
performing a chroma prediction on a chroma value of the coding block according to the prediction mode to obtain the prediction block.

6. A method for processing information, applied to an encoder, comprising:
predicting a colour component of a coding block according to a prediction mode to obtain a prediction block, wherein the prediction mode is preset and is a Position-Dependent Prediction Combination (PDPC) mode, wherein the colour component of the coding block is predicted according to the prediction mode to obtain the prediction block when any of the following conditions is met:
when the coding block is a chroma block, and the prediction mode is an angular prediction mode with an index smaller than or equal to 8; or,
when the coding block is a chroma block, and the prediction mode is an angular prediction mode with an index greater than or equal to 60;
refining the prediction block according to the prediction mode to obtain a refinement block; and
determining a difference between the coding block and the refinement block to obtain a residual block; and
signalling the residual block and the prediction mode in a bitstream.

7. The method of claim 6, wherein the colour component is a luma component.

8. The method of claim 7, further comprising:
performing a luma prediction on a luma value of the coding block according to the prediction mode to obtain the prediction block.

9. The method of claim 6, wherein the colour component is a chroma component.

10. The method of claim 9, further comprising:
performing a chroma prediction on a chroma value of the coding block according to the prediction mode to obtain the prediction block.

11. A video decoding apparatus, comprising a memory and a processor, wherein the memory stores a computer program which is runnable on the processor, and the processor implements following acts when executing the program:
obtaining a prediction mode, predicting a colour component of a coding block according to the prediction mode to obtain a prediction block, wherein the prediction mode is preset and is a Position-Dependent Prediction Combination (PDPC) mode,
wherein the colour component of the coding block is predicted according to the prediction mode to obtain the prediction block when any of the following conditions is met:
when the coding block is a chroma block, and the prediction mode is an angular prediction mode with an index smaller than or equal to 8; or,
when the coding block is a chroma block, and the prediction mode is an angular prediction mode with an index greater than or equal to 60;
refining the prediction block according to the prediction mode to obtain a refinement block.

12. The video decoding apparatus of claim 11, wherein the colour component is a luma component.

13. The video decoding apparatus of claim 11, wherein the colour component is a chroma component.

* * * * *